US007477323B2

(12) United States Patent
Chou

(10) Patent No.: US 7,477,323 B2
(45) Date of Patent: Jan. 13, 2009

(54) METHOD AND SYSTEM FOR DIGITAL IMAGE MAGNIFICATION AND REDUCTION

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 680 days.

(21) Appl. No.: 11/268,064

(22) Filed: Nov. 7, 2005

(65) Prior Publication Data

US 2007/0104394 A1    May 10, 2007

(51) Int. Cl.
  *H04N 9/74* (2006.01)
  *G06F 17/17* (2006.01)
(52) U.S. Cl. .................................. 348/581; 708/313
(58) Field of Classification Search ............... 348/581, 348/441, 580, 571; 341/61; 708/312, 313
See application file for complete search history.

(56) References Cited

U.S. PATENT DOCUMENTS

| | | | | |
|---|---|---|---|---|
| 4,020,332 A | * | 4/1977 | Crochiere et al. | ........... 708/290 |
| 5,101,446 A | * | 3/1992 | Resnikoff et al. | ........... 382/248 |
| 5,339,264 A | * | 8/1994 | Said et al. | ........... 708/319 |
| 5,907,295 A | * | 5/1999 | Lin | ........... 341/61 |
| 5,916,301 A | | 6/1999 | Rothacher | |
| 5,982,305 A | * | 11/1999 | Taylor | ........... 341/61 |
| 6,178,272 B1 | | 1/2001 | Segman | |
| 6,339,434 B1 | | 1/2002 | West et al. | |
| 6,427,157 B1 | | 7/2002 | Webb | |
| 6,501,509 B1 | | 12/2002 | Han | |
| 6,512,468 B1 | * | 1/2003 | Zhong | ........... 341/61 |
| 6,531,969 B2 | | 3/2003 | Chu | |
| 7,245,237 B2 | * | 7/2007 | Lopez-Estrada | ........... 341/61 |
| 2002/0184275 A1 | | 12/2002 | Dutta et al. | |
| 2006/0184596 A1 | * | 8/2006 | Volleberg et al. | ........... 708/300 |

* cited by examiner

*Primary Examiner*—Paulos M Natnael
(74) *Attorney, Agent, or Firm*—Pinnacle Patent Law Group

(57) ABSTRACT

An image scaling system for converting a sampling rate of an input video signal comprising input pixel data to produce a magnified or reduced output video image comprising output pixel data includes a first one-dimensional image scaler comprising a single-stage finite-duration impulse response (FIR) filter structure with poly-phase filter responses that receives and scales the input pixel data by a scaling factor in either a horizontal or vertical direction to produce output pixel data and a second one-dimensional image scaler comprising a single-stage FIR filter structure that is coupled in tandem to the first one-dimensional image scaler and scales by the scaling factor the output pixel data from the first one-dimensional image scaler in a direction perpendicular to that of the first one-dimensional image scaler to produce the magnified or reduced output video image. Each of the first and second one-dimensional image scalers includes a reconfigurable interpolation unit that allows each single-stage FIR filter structure to switch back and forth between operating in a direct-form FIR filter mode and a transposed-form FIR filter mode while using a fixed set of system resources such that a wide range of image magnification and reduction scaling factors can be achieved using the fixed set of system resources.

21 Claims, 12 Drawing Sheets

FIG. 5A
FIG. 5B
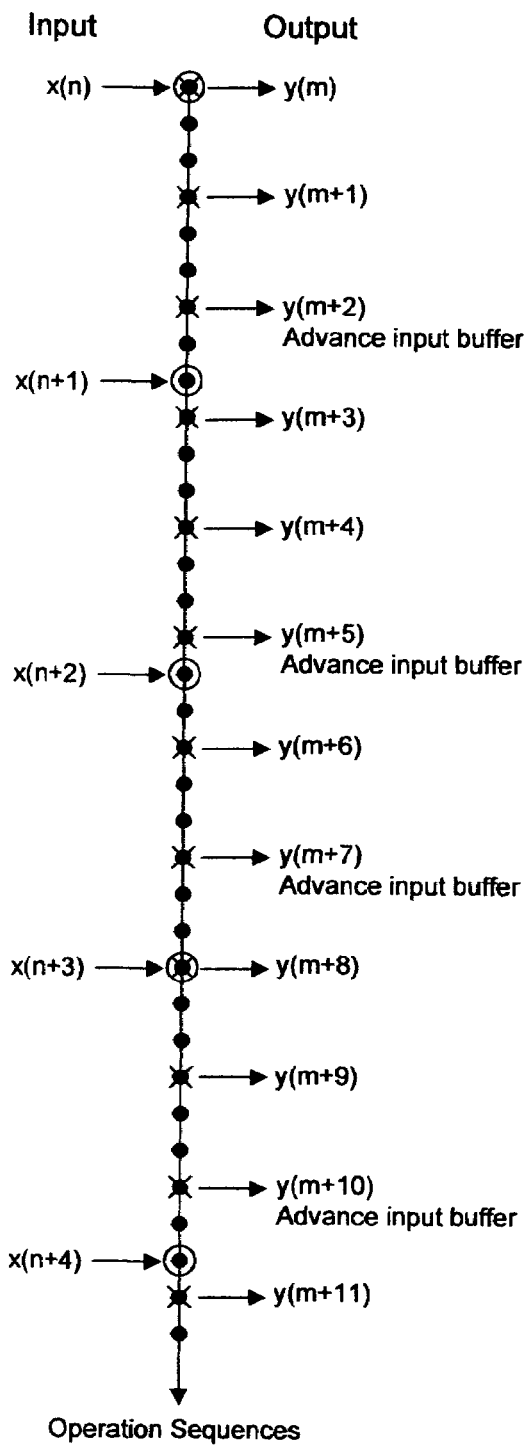
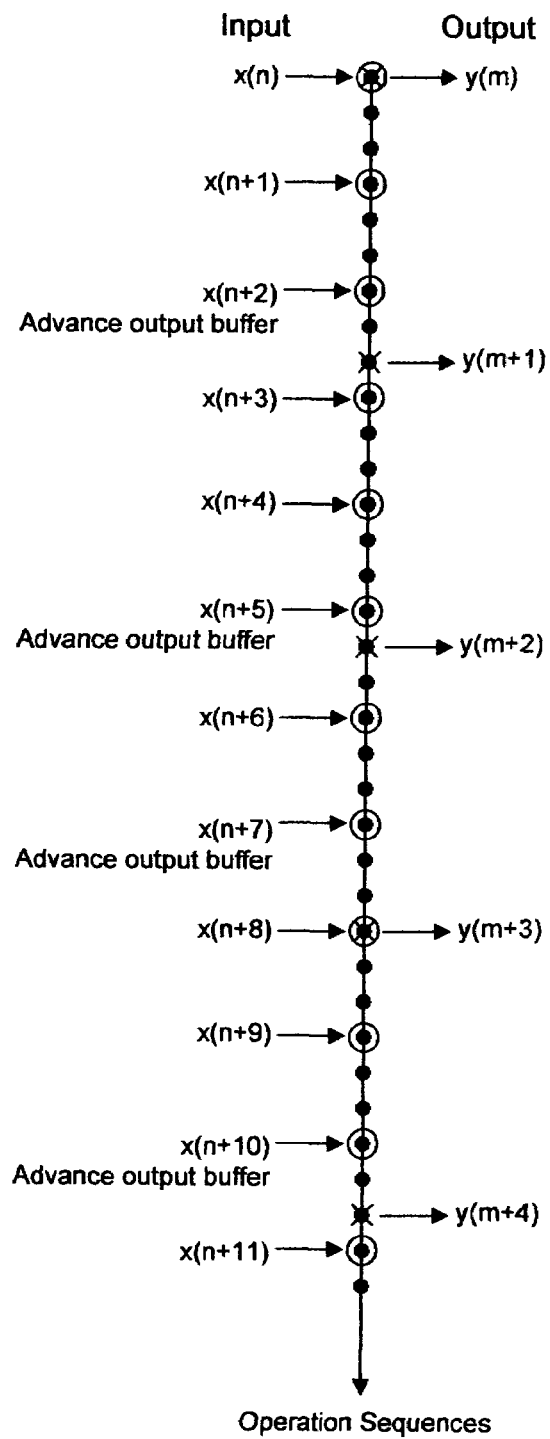
○ Input pixels    × Output pixels    • FIR filter phases

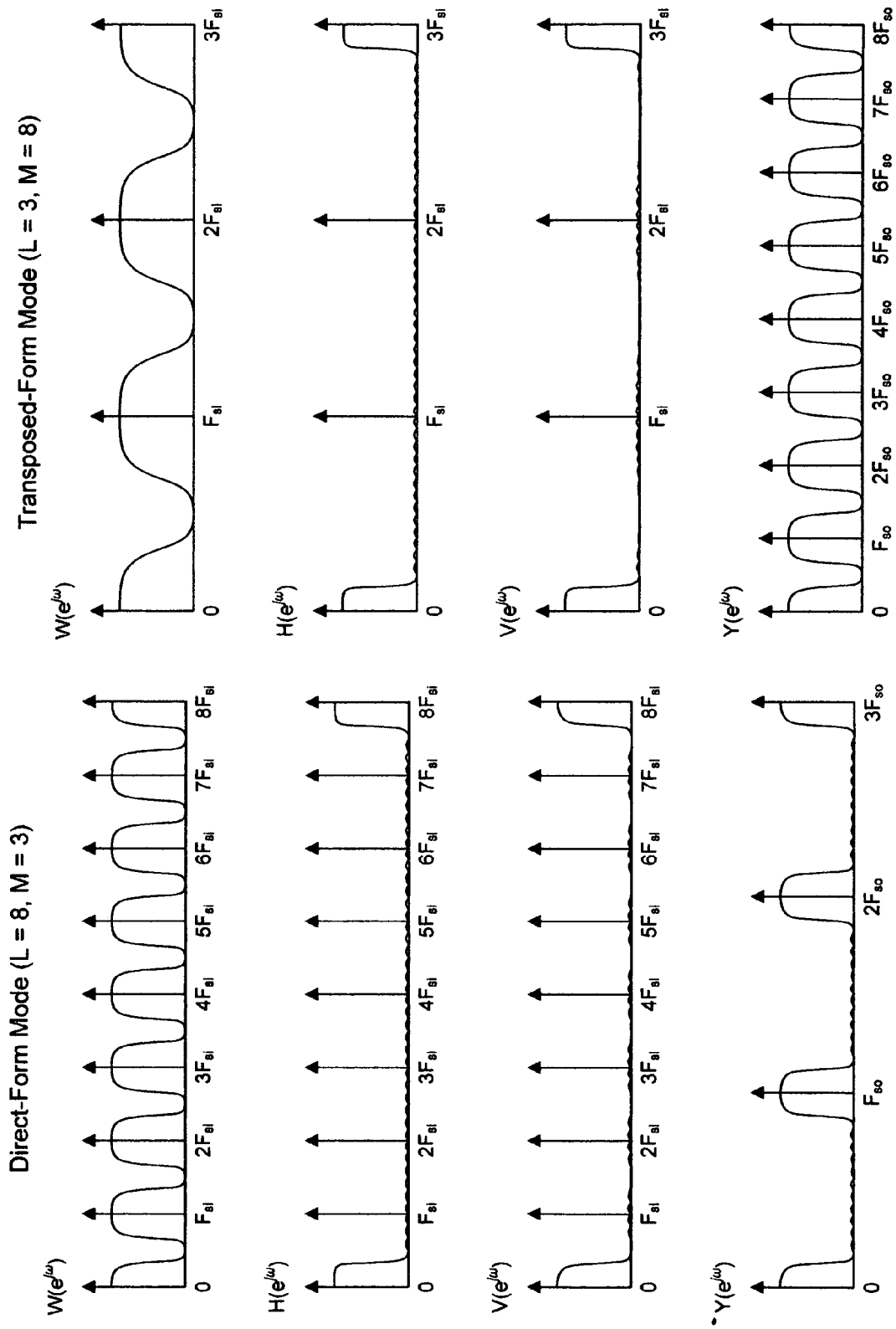

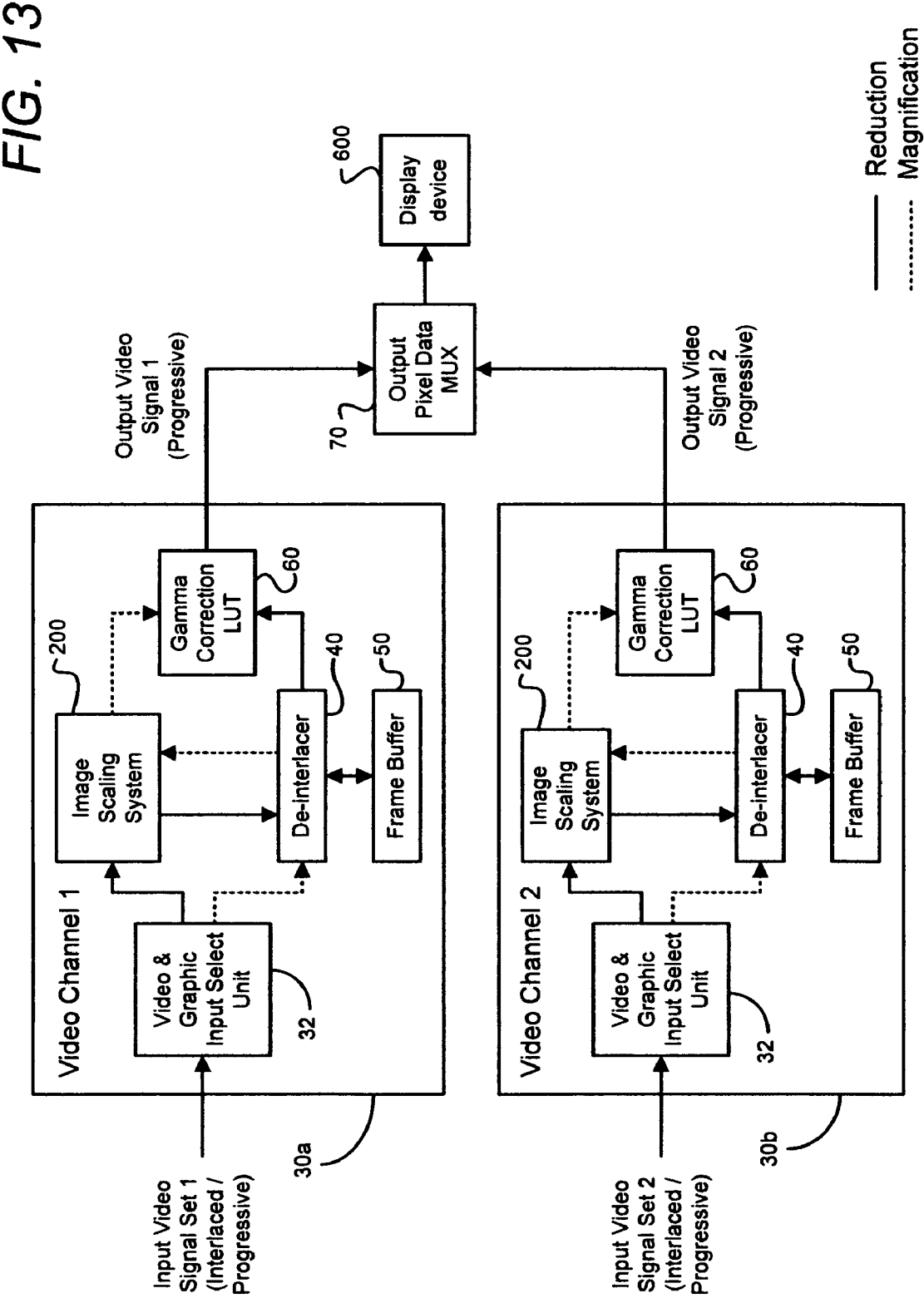

METHOD AND SYSTEM FOR DIGITAL IMAGE MAGNIFICATION AND REDUCTION

FIELD OF THE INVENTION

The present invention relates in general to video signal processing and in particular to a method and system for magnifying and reducing a digital image from a video signal using a single stage finite impulse response (FIR) filter architecture with poly-phase filter responses.

BACKGROUND OF THE INVENTION

Present day digital imaging devices, such as televisions, digital cameras, and DVDs, offer advanced features that allow a viewer to adjust the image displayed. For instance, the viewer can adjust the color balance of the outputted image, the image's brightness and/or contrast, and the image's resolution. One feature that is popular is a zoom-in/out feature that allows the viewer to magnify or shrink the displayed image. Also popular are picture-in-picture (PIP) and picture-on-picture (POP) features where the display is divided into multiple windows and each window displays a different image signal (i.e., channel), or image. Here, the sizes of the windows can vary according to the viewer's preferences. Accordingly, the degree to which the image is magnified or reduced, i.e., the scaling factor, also varies.

To convert an input image of one resolution to an output image of another resolution, each target output pixel value is a weighted average of the input pixels within a convolution window surrounding the target output pixel. For most video standards, e.g., ITU-R BT.470, ITU-R BT.601, ITU-R BT.709, each pixel value of an input video signal is sampled according to a two-dimensional rectangular sampling grid. Similarly, for most display technologies currently in use, e.g., CRT, LCD, PDP, DMD, and LCoS, each pixel value of an input video signal is also displayed according to a two-dimensional rectangular grid on the screen of the display device. For these sampling and display systems operating in two-dimensional rectangular grids, separable two-dimensional filters are often used to reduce the implementation complexity of filtering functions in hardware, firmware, software, or a combination thereof.

For image scaling, i.e., image magnification or reduction, an image scaling system using separable two-dimensional filter kernels can include two one-dimensional image scalers in tandem, one operating in the vertical direction and the other operating in the horizontal direction. The image scaling functions in the vertical and horizontal directions are commutative, thus the order of the two one-dimensional image scalers is irrelevant to the output image. That is, an input image can be first magnified or reduced horizontally and then magnified or reduced vertically, or vice versa. By utilizing two one-dimensional image scalers in tandem, the amount of computation necessary to perform the scaling functions is greatly reduced, while maintaining substantially the same level of image quality as that of a non-separable circularly-symmetric filter.

Each one-dimensional image scaler, also referred to as a sampling rate converter, can convert an image by an arbitrary rational converting factor of L/M, where L and M are integers. Such conversion is typically implemented by up-sampling the input signal L times, low-pass filtering the up-sampled result, and then down-sampling the resultant signal M times. The up-sampling, also known as interpolation, can be performed by inserting L-1 zeros between every two input pixels and the down-sampling, also known as decimation, can be performed by discarding M-1 pixels for every M pixels to output one pixel. In order to avoid unnecessary multiplication with the inserted zeros and unnecessary computation for output pixels that are discarded through down-sampling, one or more finite impulse response (FIR) filters with time-varying coefficients, i.e., poly-phase filters, are employed. The time-varying coefficients vary according to the relative proximity, i.e., the phase, between the input and output pixels.

Two forms for implementing FIR filter structures include a direct-form FIR filter structure and a transposed-form FIR filter structure. The direct-form FIR filter structure operates at the output sampling rate, and computes each output pixel as a weighted average of the associated input pixels within its convolution window. The direct-form FIR filter structure requires buffering of the input pixels and is well suited for image enlargement. The transposed-form FIR filter structure operates at the input sampling rate, and distributes and accumulates each weighted input pixel among the affected output pixels within its convolution window. The transposed-form FIR filter structure requires buffering of the output pixels and is well suited for image reduction.

FIG. 1 illustrates a block diagram of a conventional one-dimensional sampling rate converter with rational converting factors that are ratios of two integers. Such a system is described in U.S. Pat. No. 4,020,332 entitled "Interpolation-Decimation Circuit for Increasing or Decreasing Digital Sampling Frequency" and in "Interpolation and Decimation of Digital Signals—A Tutorial Review," Crochiere and Rabiner, Proceedings of the IEEE, March 1981, pp. 300-331. As shown in FIG. 1, the input pixel signal 10, x(n), is received by an L-times up-sampler 12. The output of the up-sampler 12, w(k), is transmitted to a low-pass finite-duration impulse response (FIR) filter 14 having an impulse response h(k). The output of the low-pass filter 14, v(k), is received by an M-times down-sampler 16 that produces at its output the converted signal 20, y(m).

The input pixel signal 10, x(n), with discrete Fourier transform $X(e^{j\omega})$, is up-sampled by a factor of L by inserting L-1 zeros between every two values of x(n). The resulting signal w(k) is related to x(n) by $$w(k) = \begin{cases} x(k/L), & \text{for } k = 0, \pm L, \pm 2L, \ldots \\ 0, & \text{otherwise.} \end{cases}$$

$W(e^{j\omega})$, the discrete Fourier transform of w(k), contains the original baseband spectrum of $X(e^{j\omega})$ along with replicas of $X(e^{j\omega})$ centered at integer multiples of $2\pi/L$. The up-sampled signal, w(k), is then low-pass filtered by the FIR filter 14 with impulse response h(k) and frequency response $H(e^{j\omega})$. The FIR filter 14 interpolates the zero samples of w(k), removes the replica spectra, and limits the signal spectrum by a factor of M prior to down-sampling. According to the Nyquist criterion, to generate an ideal output signal 20, y(m), that is free of replica spectra, aliasing, and pass-band attenuation, the FIR filter 14 should have an ideal frequency response given by $$H(e^{j\omega}) = \begin{cases} L, & \text{for } |\omega| \leq \min[\pi/L, \pi/M] \\ 0, & \text{otherwise.} \end{cases}$$

Because such an ideal filter is not physically realizable, various approximations are made by filters that, while physically realizable, generally introduce replica spectra, aliasing, and pass-band attenuation. Finally, the interpolated signal v(k) is down-sampled by a factor of M and the converted output signal 20 y(m) is $$y(m)=v(Mm).$$

For implementing the filter impulse response h(k) with FIR structures having time-varying coefficients, i.e., poly-phase filters, the interpolated signal v(k) is related to the input signal x(n) by $$v(k) = \sum_{j=-\infty}^{\infty} h(k-j)w(j)$$

$$= \sum_{r=-\infty}^{\infty} h(k-Lr)x(r)$$

With a suitable change of variables, $r=\lambda Mm/L\mu-n$ and modulo operations $((s))_L=s-L\lambda s/L\mu$, where $\lambda u\mu$ denotes the closest integer less than or equal to u, the converted output signal 20, y(m), is related to the input signal 10, x(n), by $$y(m) = \sum_{r=-\infty}^{\infty} h(Mm-Lr)x(r)$$

$$= \sum_{n=-\infty}^{\infty} h[Mm-L(\lambda Mm/L\mu-n)]x(\lambda Mm/L\mu-n)$$

$$= \sum_{n=-\infty}^{\infty} h(Mm-L\lambda Mm/L\mu+Ln)x(\lambda Mm/L\mu-n)$$

$$= \sum_{n=-\infty}^{\infty} h[((Mm))_L+Ln]x(\lambda Mm/L\mu-n)$$

$$= \sum_{n=-\infty}^{\infty} g_m(n)x(\lambda Mm/L\mu-n)$$

where the poly-phase filter responses $g_m(n)$ are defined as $$g_m(n)=h[((Mm))_L+Ln], \text{ for all } m \text{ and all } n$$

If the length, N, of the FIR filter impulse response h(k) is assumed to be a multiple of L, i.e., N=KL, where K is an integer, then all of the poly-phase filter responses $g_m(n)$ contain K filter coefficients for n=0, 1, . . . , K−1. Furthermore, $g_m(n)$ is periodic in m with period L, so that $$g_m(n)=g_{((m))_L}(n), \text{ for all } m \text{ and all } n$$

Therefore, the converted output signal 20, y(m), can be expressed as $$y(m) = \sum_{n=0}^{K-1} g_{((m))_L}(n)x(\lambda Mm/L\mu-n)$$

where each output pixel y(m) 20 can be calculated as a weighted sum of K consecutive input samples 10, x(n), starting at index $\lambda Mm/L\mu$ and going backward in n. The above equation relating the converted output signal 20, y(m), and the input signal 10, x(n), can be readily implemented as a single-stage direct-form FIR architecture with poly-phase filter responses as is well known to those skilled in the art.

Similarly, with another suitable change of variables, $m=\phi Lr/M\kappa+m$ ! $\phi Lr/M\kappa$ and modulo operations $((S))_M=s+M\phi!s/M\kappa$, where $\phi u\kappa$ denotes the closest integer greater than or equal to u, the converted output signal 20, y(m), is related to the input signal 10, x(n), by $$y(m) = \sum_{r=-\infty}^{\infty} h(Mm-Lr)x(r)$$

$$= \sum_{r=-\infty}^{\infty} h[M(\varphi Lr/M\kappa+m-\varphi Lr/M\kappa)-Lr]x(r)$$

$$= \sum_{r=-\infty}^{\infty} h[M\varphi Lr/M\kappa-Lr+M(m-\varphi Lr/M\kappa)]x(r)$$

$$= \sum_{r=-\infty}^{\infty} h[((!Lr))_M+M(m-\varphi Lr/M\kappa)]x(r)$$

$$= \sum_{r=-\infty}^{\infty} f_r(m-\varphi Lr/M\kappa)x(r)$$

where the poly-phase filter responses $f_r(n)$ are defined as $$f_r(n)=h[((!Lr))_M+Mn], \text{ for all } r \text{ and all } n$$

If the length, N, of the FIR filter impulse response h(k) is assumed to be a multiple of M, i.e., N=KM, where K is an integer, then all of the poly-phase filter responses $f_r(n)$ contain K filter coefficients for n=0, 1, . . . , K−1. Furthermore, $f_r(n)$ is periodic in r with period M, so that $$f_r(n)=f_{((r))_M}(n), \text{ for all } r \text{ and all } n$$

Therefore, the converted output signal 20, y(m), can be expressed as $$y(m) = \sum_{\lceil Lr/M \rceil=m-k+1}^{m} f_{((r))_M}(m-\varphi Lr/M\kappa)x(r)$$

where each input pixel 10, x(r), contributes to K consecutive output pixels of 20, y(m), starting at index $\phi Lr/M\kappa$ and going forward in m. The above equation relating the converted output pixels 20, y(m), and the input pixels 10, x(n), can be readily implemented as a single-stage transposed-form FIR architecture with poly-phase filter responses as is well known to those skilled in the art.

The FIR filter 14 having an impulse response h(k) described above must have frequency response $H(e^{i\omega})$ with a cutoff frequency of π divided by the larger of L or M. For large image magnification factors, i.e., L/M>>1; L>>M, or larger image reduction factors, i.e., L/M<<1; L<<M, one of L or M tends to be much larger than the other, resulting in a narrow-band FIR filter. According to digital filter design principles known in the art, the number of coefficients of an FIR filter 14, and thus the size of pixel buffer memory and the number of multipliers and adders, is inversely proportional to its bandwidth. Therefore, the FIR filter 14 tends to have a large number of coefficients for large image magnification or reduction factors.

For example, in a single-stage direct-form FIR filter structure, the number of filter coefficients, i.e., K=N/L, of the poly-phase filter responses $g_m(n)$ tends to increase as the image reduction factor increases. As the number of filter coefficients increases, the size of the input pixel buffer, as well as the number of multipliers and adders, must also increase. Similarly, in a single-stage transposed-form FIR architecture, the number of filter coefficients, i.e., K=N/M, of the poly-phase filter responses $f_x(n)$ tends to increase as the image magnification factor increases, causing the need for larger sized output pixel buffer memory and more multipliers and adders.

One approach to dealing with a large number of filter coefficients includes implementing multi-stage FIR filter structures. While multi-stage direct-form or transposed-form FIR filter structures can provide a means to reduce the total coefficients required for each FIR filter structure for large image magnification or reduction factors, the additional FIR stages make the filter structures and system clocks more complicated and thus increase system complexity and cost.

Accordingly, it is desirable to provide a method and apparatus that is suitable for both large image magnification and large image reduction factors. The method and apparatus should be cost effective and computationally efficient. In addition, the method and apparatus should produce an output image substantially without aliasing, moiré, and other visual artifacts over a wide range of image magnification and reduction factors.

SUMMARY OF THE INVENTION

In one embodiment, an image scaling system for converting a sampling rate of an input video signal comprising input pixel data to produce a magnified or reduced output video image comprising output pixel data includes a first one-dimensional image scaler comprising a single-stage finite-duration impulse response (FIR) filter structure with poly-phase filter responses that receives and scales the input pixel data by a scaling factor in either a horizontal or vertical direction to produce output pixel data and a second one-dimensional image scaler comprising a single-stage FIR filter structure that is coupled in tandem to the first one-dimensional image scaler and scales by the scaling factor the output pixel data from the first one-dimensional image scaler in a direction perpendicular to that of the first one-dimensional image scaler to produce the magnified or reduced output video image. Each of the first and second one-dimensional image scalers includes a reconfigurable interpolation unit that allows each single-stage FIR filter structure to switch back and forth between operating in a direct-form FIR filter mode and a transposed-form FIR filter mode while using a fixed set of system resources such that a wide range of image magnification and reduction scaling factors can be achieved using the fixed set of system resources.

In another embodiment, a display system includes a display device that includes at least one display region and a video channel associated with each of the at least one display regions. Each video channel receives an interlaced input video signal comprising even and odd video fields having evenly interlaced scan lines, and includes an image scaling system for converting a sampling rate of an input video signal. The image scaling system includes a horizontal image scaler that scales the input video signal by a scaling factor in a horizontal direction, and a vertical image scaler that scales the input video signal by the scaling factor in a vertical direction. The vertical image scaler includes a filter coefficient lookup table that stores a set of filter coefficients and a filter coefficient selection unit that selects a plurality of filter coefficients from the filter coefficient lookup table based on the relative positions of input image pixels and output image pixels to one another, and, if the input video signal is an interlaced video signal, based on whether a current input video field is an odd or even video field such that converted even and odd output video fields have scan lines that remain evenly interlaced with each other. The display system also includes a de-interlacer that converts the interlaced input video signal into a progressive video output signal.

In another embodiment, a method for scaling an input video signal by a scaling factor to produce a magnified or reduced output video image comprising converted output pixel data includes providing a first one-dimensional image scaler and a second one-dimensional image scaler, where each of the first and second one-dimensional image scalers comprises a single-stage finite-duration impulse response (FIR) filter structure with poly-phase filter responses. Each single-stage FIR filter structure is allowed to switch back and forth between operating in a direct-form FIR filter mode and a transposed-form FIR filter mode while using a fixed set of system resources. The method also includes configuring the first and second one-dimensional image scalers to operate in the direct-form FIR filter mode if the scaling factor is greater than one, and configuring the first and second one-dimensional image scalers to operate in the transposed-form FIR filter mode if the scaling factor is less than one. In this manner, a wide range of image magnification and reduction scaling factors can be achieved using the fixed set of system resources.

In another embodiment, a method for using a single-stage finite-duration impulse response (FIR) filter structure with poly-phase filter responses to scale an input video signal by a scaling factor includes selecting an interpolation constant and selecting a decimation constant, whereby the interpolation constant and decimation constant determine a number of time-varying filter coefficients that are required for image magnification and image reduction, respectively. Then, during image magnification, the method includes adjusting a down-sampling factor to a value based on the scaling factor and configuring the single-stage FIR filter structure to operate in a direct-form mode that increases a sampling rate by the interpolation constant and then decreases the sampling rate by the down-sampling factor. During image reduction, the method includes adjusting an up-sampling factor to a value based on the scaling factor and configuring the single-stage FIR filter structure to operate in a transposed-form mode that increases the sampling rate by the up-sampling factor and then decreases the sampling rate by the decimation constant. By utilizing the interpolation constant and decimation constant, the number of time-varying filter coefficients of the single-stage FIR filter structure is controlled for either the direct-form or transposed-form modes and the complexity and cost of the single-stage FIR filter structure is fixed for a wide range of image magnification and image reduction factors.

DESCRIPTION OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIGS. 5A and 5B illustrate simplified timing diagrams for the operation sequences of the image scaling system for image magnification and image reduction, respectively, according to one embodiment of the present invention;

FIGS. 7A and 7B illustrate the normalization requirements in the frequency domain for direct-form and transposed-form FIR filter structures, respectively;

FIG. 13 depicts a block diagram of the display system that utilizes the image scaling system according to one embodiment of the present invention.

DESCRIPTION OF THE INVENTION

The present invention relates in general to video signal processing and in particular to a method and system for magnifying and reducing a digital image from an input video signal using single-stage finite impulse response (FIR) filter structures with poly-phase filter responses. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to one embodiment of the present invention, a reconfigurable single-stage FIR filter structure is used in an image scaling system to magnify or reduce a digital image from an input video signal. The image scaling system includes two one-dimensional image scalers, a horizontal image scaler and a vertical image scaler. The one-dimensional image scalers are coupled in tandem, and each comprises a single-stage FIR filter structure. Each image scaler includes a reconfigurable interpolation unit that is capable of operating in a direct-form FIR filter mode or a transposed-form FIR filter mode. Because each image scaler can switch from a direct-form mode to a transposed-form mode and back, the image scaling system is suitable for both image magnification and image reduction. Accordingly, a wide range of image magnification and reduction can be performed using the reconfigurable single-stage FIR filter structures, thereby controlling costs and reducing complexity.

Figure 1:
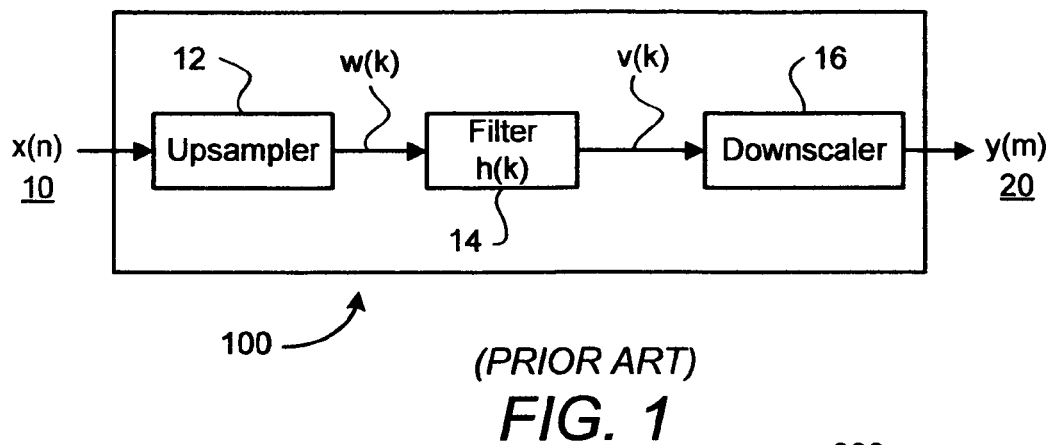
FIG. 1 is a block diagram of a one-dimensional sampling rate conversion system.
Figure 2A:
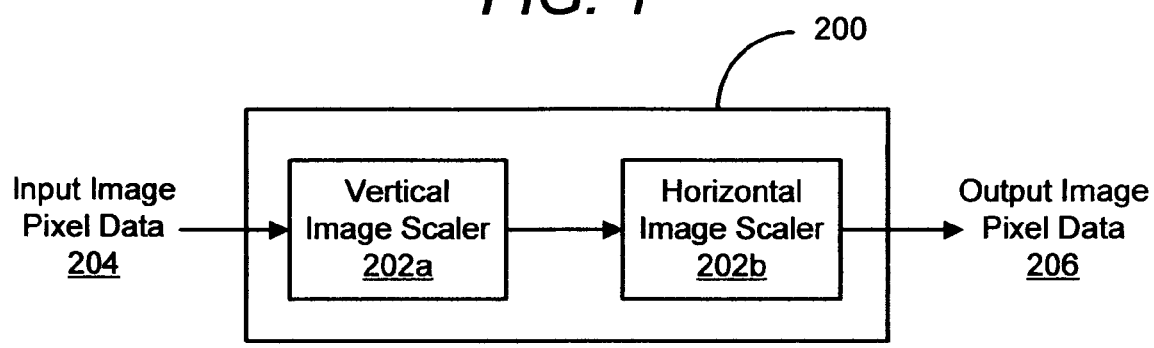
FIG. 2A is a block diagram of an image scaling system according to an embodiment of the present invention.

FIG. 2A illustrates a block diagram of the image scaling system 200 according to one embodiment. The image scaling system 200 includes two one-dimensional image scalers 202a, 202b connected in tandem. In a preferred embodiment, scaling is performed in either of a horizontal or vertical direction first, followed by vertical or horizontal scaling. In FIG. 2A, although vertical scaling is performed first by the vertical image scaler 202a, followed by horizontal scaling by the horizontal image scaler 202b, the opposite order can also be applied.

Figure 2B:
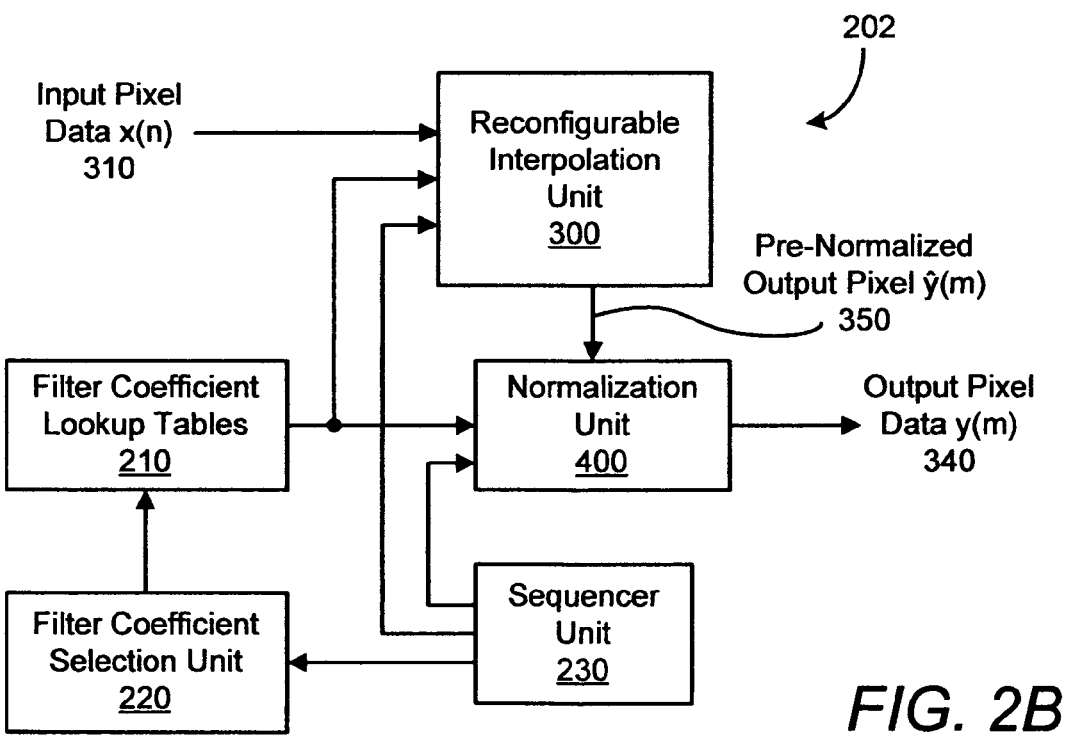
FIG. 2B is a block diagram of an image scaler according to an embodiment of the present invention.

FIG. 2B illustrates a block diagram of an image scaler according to one embodiment of the present invention. The image scaler 202 can be the vertical image scaler 202a or the horizontal image scaler 202b. According to one embodiment, the image scaler 202 includes a single-stage FIR filter structure that can operate in one of two modes, a direct-form mode or a transposed-form mode. The image scaler 202 operates in the direct-form mode preferably when an input image is magnified, i.e., L>M. In this mode, the image scaler 202 calculates an output pixel value based on the selected filter coefficients and the input pixel data of pixels within a convolution window surrounding the output pixel. Conversely, the image scaler 202 operates in the transposed-form mode preferably when the input image is reduced, i.e., L<M. Here, the image scaler 202 calculates the output pixel value by distributing and accumulating the input pixel data using the selected filter coefficients among the output pixels within a convolution window surrounding the input pixel.

In a preferred embodiment, the image scaler 202 comprises at least one filter coefficient lookup table (LUT) 210, a filter coefficient selection unit 220, a sequencer unit 230, the reconfigurable interpolation unit 300, and an output pixel normalization unit 400. The filter coefficient LUT 210 stores a complete set of filter coefficients for calculating the interpolation and decimation values for image magnification and reduction. The coefficient selection unit 220 selects a plurality of filter coefficients from the filter coefficient LUTs 210 according to the relative positions of the input image pixels and the output image pixels to one another.

For the horizontal image scaler 202b, the filter coefficient selection unit 220 selects a plurality of suitable filter coefficients from the filter coefficient LUT 210 for each output pixel data 340 in the direct-form FIR filter structure, and a plurality of suitable filter coefficients for each input pixel data 310 in the transposed-form FIR filter structure. For the vertical image scaler 202a, the filter coefficient selection unit 220 selects a plurality of suitable filter coefficients from the filter coefficient LUT 210 for each output scan line in the direct-form FIR filter structure, where the same set of filter coefficients is used for each output pixel data 340 on the same output scan line, and a plurality of suitable filter coefficients for each input scan line in the transposed-form FIR filter structure, where the same set of filter coefficients is used for each input pixel data 310 on the same input scan line.

The sequencer unit 230 transmits control and clock signals to the filter coefficient selection unit 220, the reconfigurable interpolation unit 300 and to the output pixel normalization unit 400. The control and clock signals control the transfer of the selected filter coefficients to the reconfigurable interpolation unit 300 and to the normalization unit 400, controls the transfer of the input pixel data 310 and the output pixel data 340, and determines in which mode the reconfigurable interpolation unit 300 and the output pixel normalization unit 400 operate.

The reconfigurable interpolation unit 300 receives the selected filter coefficients, control and clock signals, and the input pixel data values and generates pre-normalized output pixel data values 350, which are received by the output pixel normalization unit 400. The output pixel normalization unit 400 normalizes pre-normalized output pixel data values 350 to eliminate fixed patterns of sampling structure from the output image. This aspect will be described in more detail below.

Figure 3:
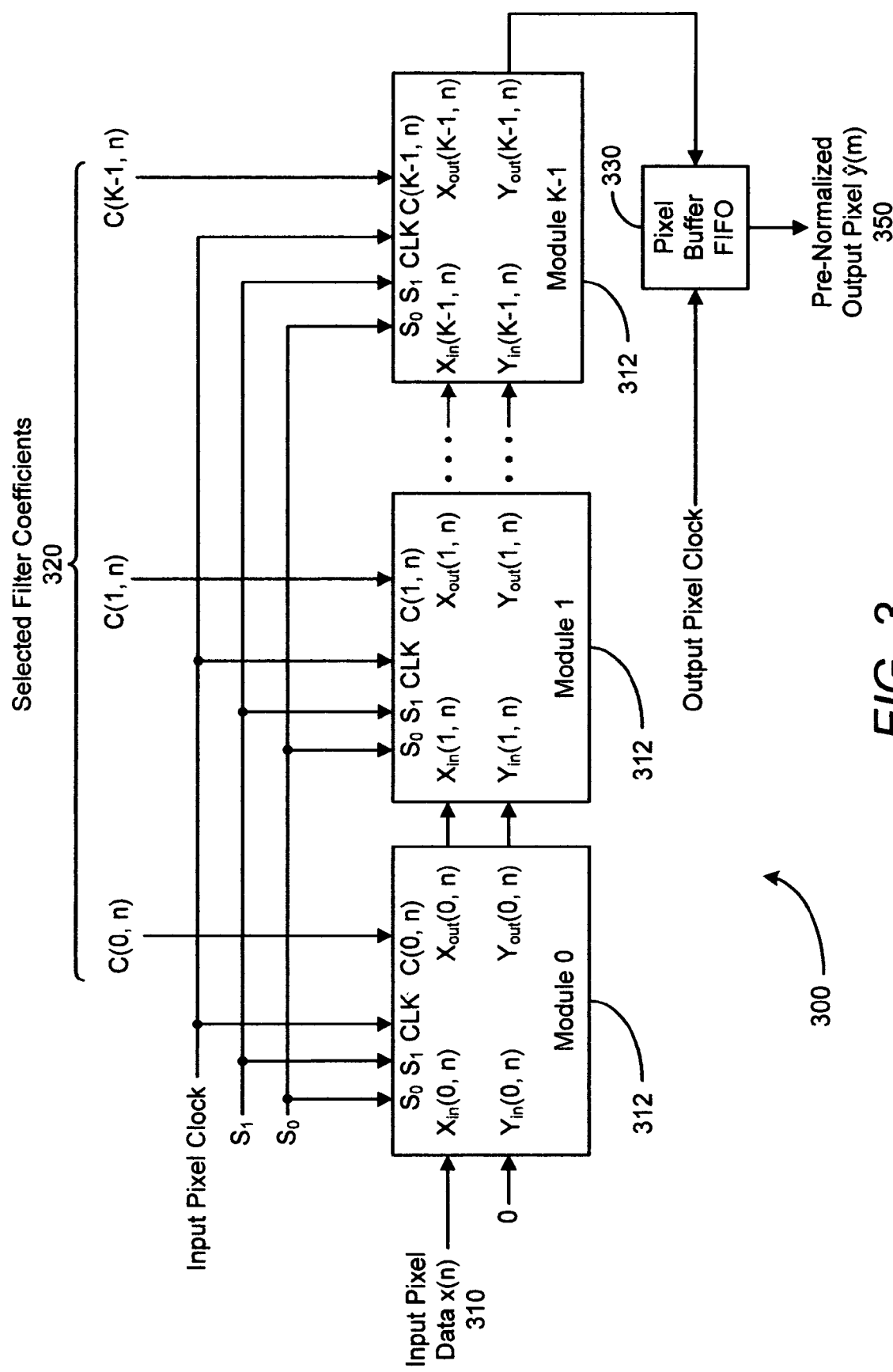
FIG. 3 is a block diagram of the reconfigurable interpolation unit according to one embodiment.

FIG. 3 is a block diagram of the reconfigurable interpolation unit 300 according to one embodiment. The reconfigurable interpolation unit 300 receives selected filter coefficients 320 from the filter coefficient LUT 210, as well as control signals, $S_0$ and $S_1$, and input and output pixel clock signals from the sequencer unit 230. As stated above, the control signals, $S_0$ and $S_1$, determine in which mode, direct-form or transposed-form, the image scaler 202a or 202b operates.

The reconfigurable interpolation unit 300 includes a plurality of coupled interpolation modules 312, where each interpolation module 312 corresponds to and receives a selected filter coefficient 320. Each interpolation module 312 uses the corresponding filter coefficient 320 to generate output values $X_{out}$ and $Y_{out}$ from input values $X_{in}$ and $Y_{in}$. While the embodiment illustrated in FIG. 3 generates an output pixel luminance value from an input luminance value for a monochrome input signal, the interpolation module 312 can be extended to generate an output pixel color component value from a corresponding input pixel color component value for a multi-component color video input signal in various color signal formats, e.g., such as RGB, YUV, and YCbCr. For example, for a multi-component color video input signal, identical blocks of the reconfigurable interpolation unit 300 according to the present invention can be employed in parallel or in tandem to handle each of the color component signals.

According to one embodiment of the present invention, the selected filter coefficients 320 from the filter coefficient lookup table 210 depends on the relative position among the input image pixels and the output image pixels. Thus, one set of selected filter coefficients 320 can be used for each color component signal of a same pixel. According to another embodiment of the present invention, different filter phases are used for different color component signals to achieve slightly better visual performance. For example, for display devices such as LCD or PDP that have fixed pixels consisting of spatially distributed sub-pixels, different sets of selected filter coefficients 320 can be used for different color component signals corresponding to different sub-pixels of a same pixel. This technique is called sub-pixel rendering and is well known to those skilled in the art.

Figure 4A:
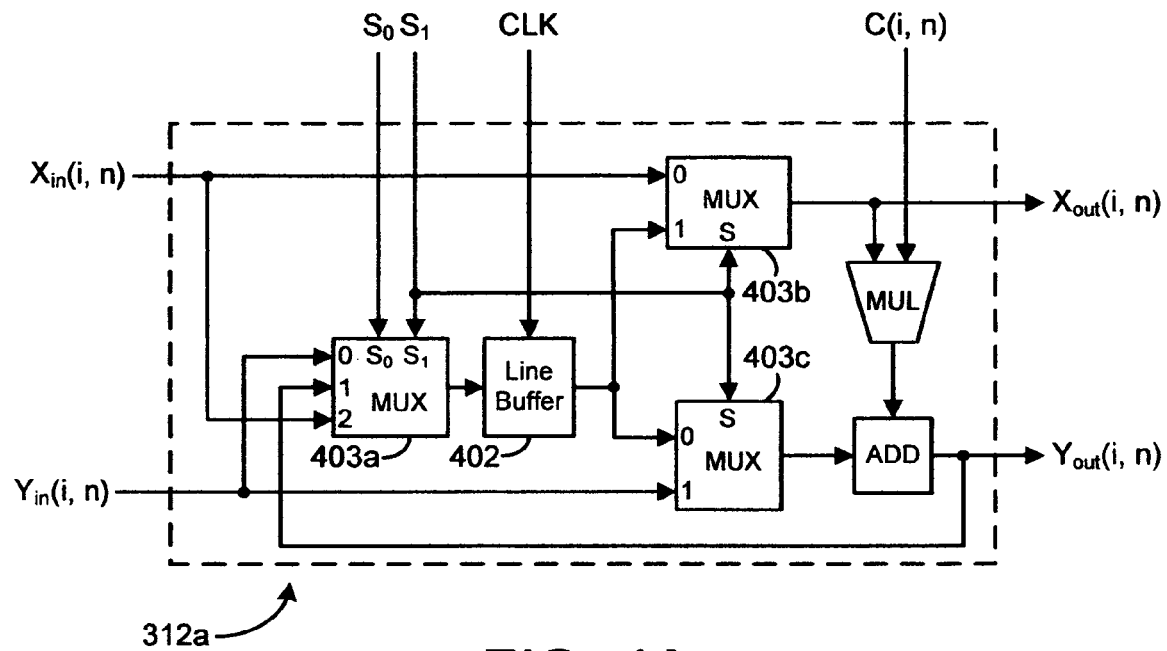
FIG. 4A and FIG. 4B are block diagrams of the interpolation module utilized by the vertical and the horizontal image scalers, respectively, according to one embodiment of the present invention.
Figure 4B:
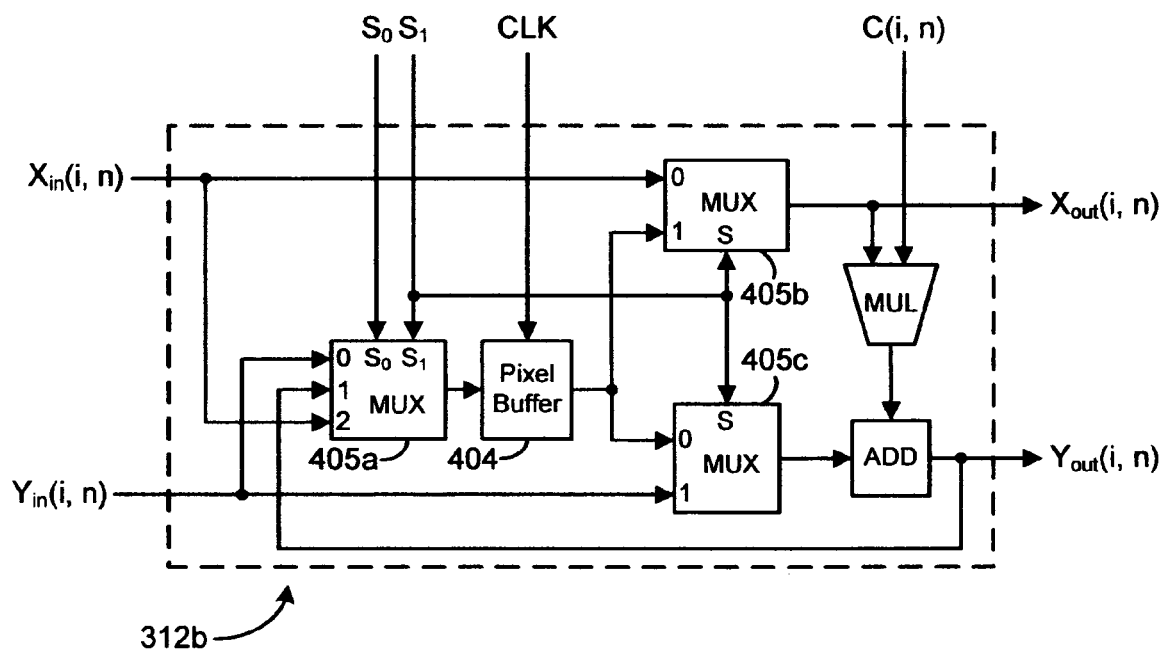

FIG. 4A and FIG. 4B are block diagrams of the interpolation module 312 utilized by the vertical and the horizontal image scalers 202a, 202b, respectively, according to one embodiment of the present invention. The interpolation module 312a utilized by the vertical image scaler 202a includes a line buffer 402 that receives the input pixel clock signal. Whereas, the interpolation module 312b utilized by the horizontal image scaler 202b includes a pixel buffer 404 that also receives the input pixel clock signal. Aside from the buffers 402, 404, both interpolation modules 312a, 312b have similar components, e.g., three (3) multiplexers, a multiplier, and an adder, and operate in a similar fashion. Both interpolation modules 312a, 312b receive input values, $X_{in}$ and $Y_{in}$, from a preceding module 312 and corresponding filter coefficients 320, C. The interpolation modules 312a, 312b also receive the clock and control signals, $S_0$ and $S_1$. Both interpolation modules 312a, 312b generate output values, $X_{out}$ and $Y_{out}$.

Referring to FIG. 4A, a first multiplexer (MUX) 403a receives three inputs, the input value $Y_{in}$ and the input value $X_{in}$, from the preceding interpolation module, and the output value $Y_{out}$ to the next module. The first MUX 403a outputs any one of the three inputs depending on the control signals, $S_0$ and $S_1$. The output of the first MUX 403a is received by the line buffer 402, whose output is controlled by the input pixel clock signal. The output of the line buffer 402 is received by second and third MUXs 403b, 403c. The second MUX 403b also receives the input value $X_{in}$ and the third MUX 403c also receives the input value $Y_{in}$. The output of the second MUX 403b, i.e., the input value $X_{in}$ or the output of the line buffer 402 is determined by control signal $S_1$, which also controls the output of the third MUX 403c. The output of the second MUX 403b is the output value $X_{out}$, which is received by the next interpolation module. In addition, the output value $X_{out}$ is multiplied by the corresponding filter coefficient C. The resulting product is received by the adder, which also receives the output from the third MUX 403c. The output of the adder is the output value $Y_{out}$, which is received by the next interpolation module, and also sent back to the first MUX 403a.

As stated above, the control signals, $S_0$ and $S_1$, determine whether the interpolation module 312 operates in a direct-form mode or in a transposed-form mode according to Table 1.

TABLE 1

| $S_1$ | $S_0$ | Action Performed |
|---|---|---|
| 0 | 0 | Transposed-form (accumulate and output) |
| 0 | 1 | Transposed-form (accumulate only) |
| 1 | 0 | Direct-form |

For example, in a direct-form mode, the output of the first MUX 403a is input value $X_{in}$, which is then received by the line buffer 402. The output of the second MUX 403b is the output of the line buffer, which is also the output value $X_{out}$. The output of the line buffer is also multiplied by the filter coefficient C and added to the output of the third MUX 403c, which is the input value $Y_{in}$. Thus, the output value $Y_{out}$ is the sum of the input value $Y_{in}$ and the product of the output of the line buffer and the filter coefficient C.

Referring again to FIG. 3, the input pixel 310, x(n), is connected to the input $X_{in}$ of the first interpolation module 312 and the output value $Y_{out}$ of the last interpolation module 312 is received by a pixel buffer 330, which also receives an output pixel clock signal from the sequencer unit 230 (FIG. 2B). The output of the pixel buffer 330 is the pre-normalized output pixel value 350, ŷ(m).

In a preferred embodiment, the same components in each interpolation module 312a, 312b, e.g., buffers, multiplexers, multipliers, and adders, are shared between both operation modes. Thus, a dual mode FIR filter structure is implemented using a single set of components, thereby minimizing system resources and reducing cost and complexity. Moreover, because the interpolation modules 312a, 312b operate in both direct-form and transposed-form modes, the image scaling system 200 can handle image magnification and reduction factors efficiently.

FIGS. 5A and 5B illustrate simplified timing diagrams for the operation sequences of the image scaling system 200 for image magnification and image reduction, respectively, according to the present invention. As is shown, the image scaling system 200 operates at the faster one of the input or output pixel clocks. Accordingly, for image magnification, the image scalers 202a, 202b operate in the direct-form mode at the output pixel clock, while for image reduction, the image scalers 202a, 202b operate in the transposed-form mode at the input pixel clock. Note that the image scalers 202a and 202b can operate in different modes, i.e., one scaler 202a operates in the direct-form mode for image magnification in either the vertical or horizontal direction, while the other scaler 202b operates in the transposed-form mode for image reduction in the other direction.

As stated above, when the image is magnified, i.e., L>M, the image scalers 202a, 202b operate in the direct-form mode, and when the image is reduced, i.e., L<M, the image scalers 202a, 202b operate in the transposed-form mode. Nevertheless, as noted above, when either the magnification or reduction factor is very large, i.e., L>>M or L<<M, respectively, the cutoff frequency of the direct-form and transposed-form FIR filter structures becomes very small. Thus, for large magnification or reduction factors, the number of FIR filter coefficients required increases because the number of FIR filter coefficients is inversely proportional to the cutoff frequency. A large number of FIR filter coefficients require larger LUTs 210 and a larger number of interpolation modules 312, which can escalate the cost and complexity of the system.

To address this issue, according to a preferred embodiment, the FIR filter structure is configured with a fixed predetermined value of $L_D$ and a variable $M_D$ when in the direct-form mode, and a fixed predetermined value of $M_T$ and a variable $L_T$ when in the transposed-form mode. The fixed predetermined value of $L_D$ is referred to as an interpolation constant, and the fixed predetermined value of $M_T$ is referred to as a decimation constant. The variable $M_D$ is referred to as a down-sampling factor and the variable $L_T$ is referred to as an up-sampling factor. Accordingly, a wide range of magnification scaling factors can be realized by adjusting the down-sampling factor, $M_D$, with respect to the interpolation constant, $L_D$, and a wide range of reduction scaling factors can be realized by adjusting the up-sampling factor, $L_T$, with respect to the decimation constant, $M_T$.

According to a preferred embodiment, for different magnification scaling factors, the number of the coefficients, $N_D$, of the FIR filter $h_D(k)$ is set by the interpolation constant, $L_D$, and therefore, the number of filter coefficients, $K_D=N_D/L_D$, of the poly-phase filter responses $g_m(n)$ is fixed. Similarly, for different reduction scaling factors, the number of the coefficients, $N_T$, of the FIR filter $h_T(k)$ is set by the decimation constant, $M_T$, and therefore, the number of filter coefficients, $K_T=N_T/M_T$, of the poly-phase filter responses $f_r(n)$ is fixed.

In a preferred embodiment, the interpolation constant $L_D$ and the decimation constant $M_T$ are set to the same value. By so doing, the number of filter coefficients for both direct-form and transposed-form modes is the same. Put another way:

$L_D=M_T=P$ and $h_D(k)=h_T(k)=h(k)$ then $f_m(n)=g_{Lm}(n)$ for each value of $M_D=L_T \leq P$ In this embodiment, the same set of predetermined filter coefficient values stored in the filter coefficient LUT 210 can be shared by both direct-form and transposed-form FIR filter structures for a wide range of magnification and reduction scaling factors. Therefore, fixed non-programmable filter coefficient lookup tables 210 can be employed, which eliminates an external read/write bus and control of the filter coefficient LUT 210, thereby further reduces the system complexity and cost.

Moreover, because the number of filter coefficients for both direct-form and transposed-form modes is the same, a common amount of pixel buffer memory, multipliers, and adders are shared by both the direct-form and transposed-form FIR architectures, resulting in optimal system design with full system resource utilization for both direct-form and transposed-form modes.

As stated above, a wide range of magnification scaling factors can be realized by adjusting the down-sampling factor, $M_D$, with respect to the interpolation constant, $L_D$, and a wide range of reduction scaling factors can be realized by adjusting the up-sampling factor, $L_T$, with respect to the decimation constant, $M_T$. According to one embodiment, arbitrary magnification and reduction scaling factors with predetermined precision can be achieved by allowing the down-sampling factor, $M_D$, or the up-sampling factor, $L_T$, to have a non-integer value. By doing so, the granularity of scaling factor control can be made arbitrarily fine. Therefore, fine scaling factor control with arbitrary precision can be achieved using fixed system resources.

According to one embodiment, the filter coefficient selection unit 220 (FIG. 2) selects a plurality of filter coefficients from the filter coefficient LUT 210 according to the relative position among the input image pixels and the output image pixels. The interpolation constant $L_D$ and the decimation constant $M_T$ are preferably a power of 2 to facilitate the division and modulo operations with bit-shifting and bit-masking operations, respectively, in calculating the filter phases and coefficient addresses for the selected filter coefficients from the filter coefficient LUT 210. The algorithms for selecting filter coefficients from the filter coefficient LUT 210 and for calculating the scaled output pixels for direct-form and transposed-form modes, respectively, according to the present invention are listed below. Note that round(u) denotes the integer closest to u.

Direct-Form FIR Filter Structure

Algorithm 1:
For a direct-form FIR filter structure with integer L and integer M (L≧M), the FIR filter coefficients are organized in L groups of K filter coefficients, where each group of K filter coefficients is indexed by the filter phase φ. The input buffer contains K consecutive input pixel values.

```
P_accum ← P_init
x ← 0
while x ≦ X_max
    Calculate one output pixel from input buffer with filter phase φ =
        P_accum
    P_accum ← P_accum + M
    if P_accum ≧ L
        Advance input buffer by one input pixel
        x ← x + 1
        P_accum ← P_accum − L
    end
end
```

Algorithm 2:
For a direct-form FIR filter structure with integer L and non-integer M (L≧M), the FIR filter coefficients are organized in L groups of K filter coefficients, where each group of K filter coefficients is indexed by the filter phase φ. The input buffer contains K consecutive input pixel values.

```
P_accum ← P_init
x ← 0
while x ≤ X_max
    Calculate one output pixel from input buffer with filter phase φ =
    round(P_accum)
    P_accum ← P_accum + M
    if round(P_accum) ≥ L
        Advance input buffer by one input pixel
        x ← x + 1
        P_accum ← P_accum − L
    end
end
```

Algorithm 3:

For a direct-form FIR filter structure with non-integer L and integer M (L≧M), the FIR filter coefficients are organized in an array of φLκ×K filter coefficients, where each filter coefficient is indexed by the coefficient address α. The input buffer contains K consecutive input pixel values.

```
P_accum ← P_init
x ← 0
while x ≤ X_max
    Calculate one output pixel from input buffer with coefficient
    addresses:
        α(i) = round(P_accum + i × L), i = 0, 1, ... , K − 1.
    P_accum ← P_accum + M
    if P_accum ≥ L
        Advance input buffer by one input pixel
        x ← x + 1
        P_accum ← P_accum − L
    end
end
```

Transposed-Form FIR Filter Structure

Algorithm 4:

For a transposed-form FIR filter structure with integer L and integer M (L≦M), the FIR filter coefficients are organized in M groups of K filter coefficients, where each group of K filter coefficients is indexed by the filter phase φ. The output buffer contains K consecutive partial output pixel values.

```
P_accum ← P_init
x ← 0
while x ≤ X_max
    Accumulate one input pixel to output buffer with filter phase φ =
    P_accum
    x ← x + 1
    P_accum ← P_accum + L
    if P_accum ≥ M
        Advance output buffer by one output pixel and deliver one
        output pixel
        P_accum ← P_accum − M
    end
end
```

Algorithm 5:

For a transposed-form FIR filter structure with integer L and non-integer M (L≦M), the FIR filter coefficients are organized in an array of φMκ×K filter coefficients, where each filter coefficient is indexed by the coefficient address α. The output buffer contains K consecutive partial output pixel values.

```
P_accum ← P_init
x ← 0
while x ≤ X_max
    Accumulate one input pixel to output buffer with coefficient addresses:
        α(i) = round(P_accum + i × M), i = 0, 1, ... , K − 1.
    x ← x + 1
    P_accum ← P_accum + L
    if P_accum ≥ M
        Advance output buffer by one output pixel and deliver one
        output pixel
        P_accum ← P_accum − M
    end
end
```

Algorithm 6:

For a transposed-form FIR filter structure with non-integer L and integer M (L≦M), the FIR filter coefficients are organized in M groups of K filter coefficients, where each group of K filter coefficients is indexed by the filter phase φ. The output buffer contains K consecutive partial output pixel values.

```
P_accum ← P_init
x ← 0
while x ≤ X_max
    Accumulate one input pixel to output buffer with filter phase φ =
    round(P_accum)
    x ← x + 1
    P_accum ← P_accum + L
    if round(P_accum) ≥ M
        Advance output buffer by one output pixel and deliver one
        output pixel
        P_accum ← P_accum − M
    end
end
```

Figures 6A, 6B:
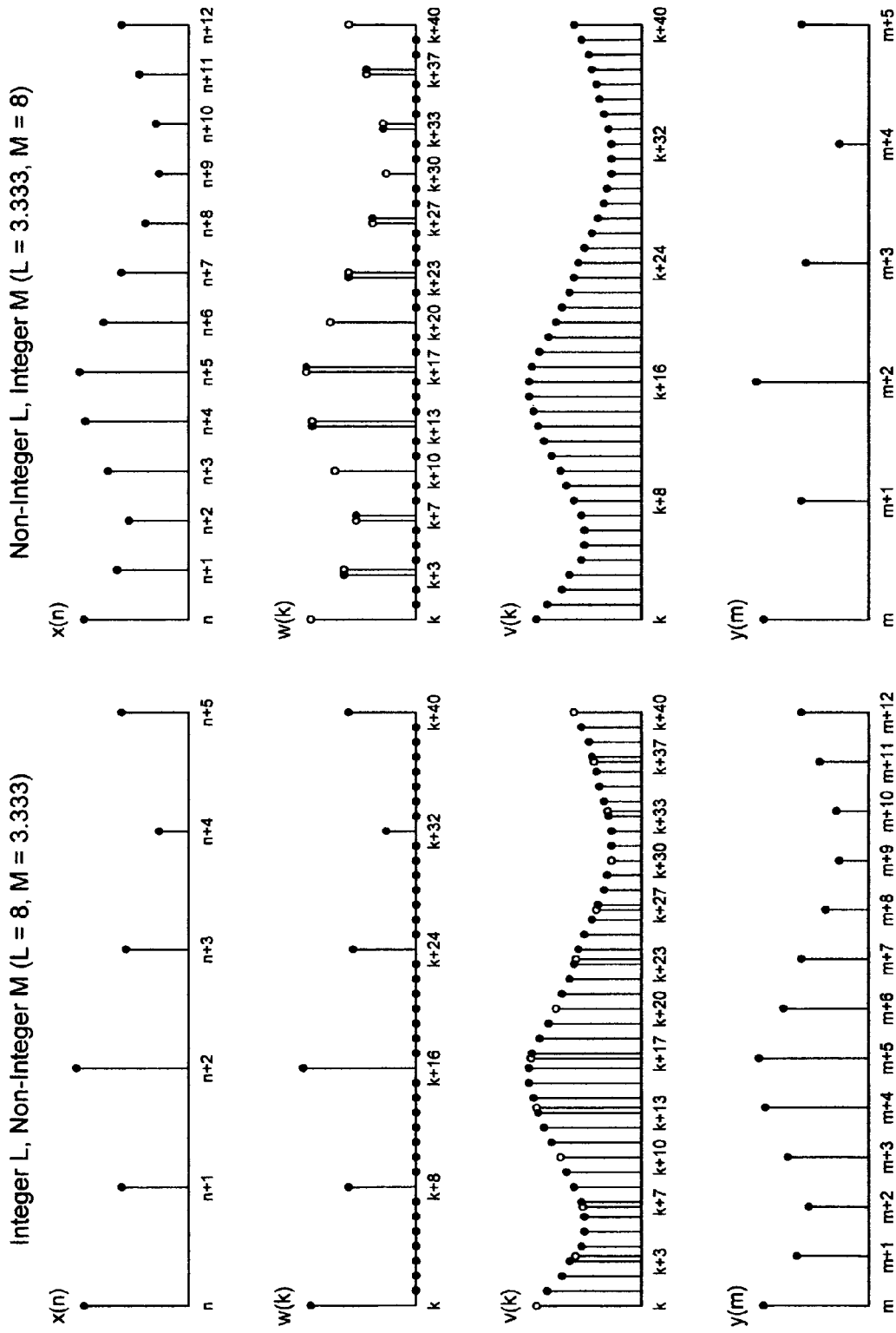
FIGS. 6A and 6B illustrate signal sequences of sampling rate conversion for non-integer M (direct-form) and non-integer L (transposed-form), respectively, according to one embodiment of the present invention.

In a preferred embodiment, algorithm number 2 is utilized for the direct-form mode and algorithm number 6 is utilized for the transposed-form mode. FIGS. 6A and 6B illustrate relevant signal sequences of sampling rate conversion for non-integer M (direct-form) and non-integer L (transposed-form), respectively, utilizing algorithm number 2 and algorithm number 6, respectively.

Referring again to FIG. 2B, the reconfigurable interpolation unit 300 outputs pre-normalized output pixel values 350, which are received by the output pixel normalization unit 400. As stated above, the output pixel normalization unit 400 normalizes the pre-normalized output pixel data values 350 in order to eliminate fixed patterns of sampling structure from the output image that can result when the output image corresponds to a constant input image. In particular, in the frequency domain, a constant input image corresponds to a line spectrum at zero frequency, i.e., a DC component, and replicas of line spectrum at multiples of $2\pi/L$ frequencies. If the replicas are not suppressed in the output spectrum, harmonics of $2\pi/L$ frequency will be present in the output spectrum, which correspond to fixed image patterns of sampling structures in the spatial domain. To avoid such visual artifacts in the output image, the image scaler 202 must satisfy the Nyquist criterion, as is well known to those skilled in the art.

For a single-stage direct-form FIR filter structure with poly-phase filter responses, each output pixel corresponding to a constant input image is the sum of all filter coefficients for a selected poly-phase filter response multiplied by the input pixel value, which is a constant. To satisfy the Nyquist criterion, $$y(m) = \left[\sum_{n=0}^{K-1} g_{((m))_L}(n)\right] x_i = y_i$$

where $x_i$ and $y_i$ are the constant input and output pixel values, respectively. To satisfy this condition, each of the poly-phase filter responses $g_{((m))_L}(n)$ is normalized accordingly so that all of the sums shown above have the same value for all values of m.

For a single-stage transposed-form FIR filter structure with poly-phase filter responses, each output pixel corresponding to a constant input image is the sum of selected filter coefficients from selected poly-phase filter responses multiplied by the input pixel value, which is a constant. To satisfy the Nyquist criterion, $$y(m) = \left[\sum_{\lceil Lr/M \rceil = m-k+1}^{m} f_{((r))_M}(m - \varphi Lr/M\kappa)\right] x_i = y_i$$

where $x_i$ and $y_i$ are the constant input and output pixel values, respectively. To satisfy this condition, each of the poly-phase filter responses $f_{((r))_M}(n)$ is normalized accordingly so that all of the sums shown above have the same value for all values of m.

FIGS. 7A and 7B illustrate the normalization requirements in the frequency domain for direct-form and transposed-form FIR filter structures, respectively. As is shown in FIGS. 7A and 7B, for both image magnification (L>M) and image reduction (L<M), the frequency response $H(e^{j\omega})$ of the FIR filter h(k) must have stop-band zeros located at multiples of $2\pi/L$ frequencies to satisfy the Nyquist criterion.

The normalization of the filter coefficients depends on the value of L. According to one embodiment, for image magnification, where the value of L is the interpolation constant, $L_D$, and the value of the down-sampling factor, $M_D$, is variable, the same normalized set of filter coefficients can be used for different values of the down-sampling factor, $M_D$. For image reduction, where the value of M is the decimation constant, $M_T$, and the value of the up-sampling factor, $L_T$, is variable, different normalized sets of filter coefficients can be used for different values of the up-sampling factor $L_T$.

If the up-sampling factor $L_T$ is allowed to be a non-integer for fine scaling factor control, the instantaneous value of up-sampling factor $L_T$ will fluctuate between $\lambda L\mu$ and $\phi L\kappa$ during the image scaling process. In this case, dynamic normalization of the filter coefficients should be performed for different instantaneous values of $L_T$. If the down-sampling factor $M_D$ is allowed to be a non-integer for fine scaling factor control, the instantaneous value of the down-sampling factor $M_D$ will fluctuate between $\lambda M\mu$ and $\phi M\kappa$ during the image scaling process. In this case, static normalization of the filter coefficients can be performed because the normalization of the filter coefficients does not depend on the instantaneous value of the down-sampling factor $M_D$.

Table 2 lists various possible schemes for assigning the values of L and M and the corresponding schemes for normalization of the filter coefficients.

TABLE 2

| Architecture | Algorithm | L Value | M Value | Normalization Schemes |
|---|---|---|---|---|
| Direct-Form Fixed L | 1 | integer | integer | Fixed with same coefficient LUT |
| | 2 | integer | non-integer | Fixed with same coefficient LUT |
| Variable M | 3 | non-integer | integer | Dynamic with same coefficient LUT |
| Transposed-Form Variable L | 4 | integer | integer | Fixed with coefficient LUT reloaded for L |
| | 5 | integer | non-integer | Fixed with coefficient LUT reloaded for L |
| Fixed M | 6 | non-integer | integer | Dynamic with same coefficient LUT |

Three normalization schemes are possible from the table: (1) fixed normalization with the same filter coefficient LUT; (2) fixed normalization with filter coefficient LUT reloaded for different values of L; and (3) dynamic normalization with the same filter coefficient LUT. Note that normalization scheme (1) is most simple, while normalization scheme (3) is most complicated. If normalization scheme (3) is implemented, it can readily replace normalization scheme (1) and (2).

According to one embodiment, the positions of the stop-band zeros of the FIR filter frequency response is dynamically adjusted by the output pixel normalization unit 400 substantially without affecting the pass-band characteristics. In particular, for vertical image scaling, the output pixel normalization unit 400 for the vertical image scaler 202a accumulates the total filter coefficient received by output pixels on each output scan line on a line-by-line basis and divides each output pixel on each output scan line by its corresponding total filter coefficient. For horizontal image scaling, the output pixel normalization unit 400 for the horizontal image scaler 202b accumulates the total filter coefficient received by each output pixel on a pixel-by-pixel basis and divides each output pixel by its corresponding total filter coefficient.

The accumulation of the total filter coefficient for each output pixel is imperative for schemes that require dynamic normalization of the filter coefficients to calculate the dynamic total filter coefficient for each output pixel. For schemes that require static normalization of the filter coefficients, the accumulation of the total filter coefficient for each output pixel is optional and predetermined normalized sets of filter coefficients for different values of up-sampling factor L can be used. For static normalization of the filter coefficients, the total filter coefficient for each output pixel has a predetermined value, which is preferably a power of 2 to facilitate the division operation with bit-shifting operations.

Figure 8:
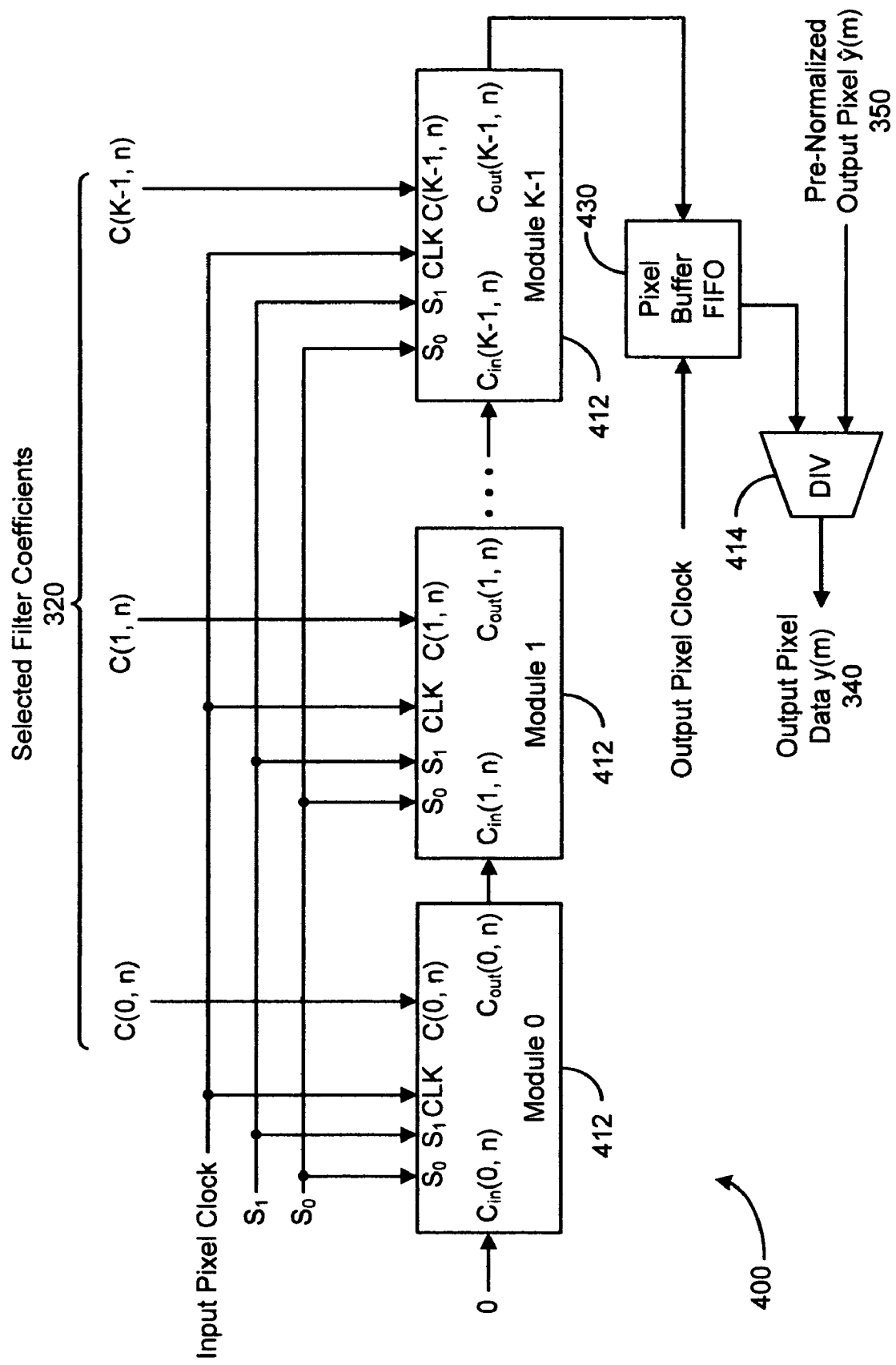
FIG. 8 is a block diagram of the output pixel normalization unit according to the present invention.

FIG. 8 is a block diagram of the output pixel normalization unit 400 according to the present invention. The output pixel normalization unit 400 receives selected filter coefficients 320 from the filter coefficient LUT 210, as well as control signals, $S_0$ and $S_1$, and input and output pixel clock signals from the sequencer unit 230. As stated above, the control signals, $S_0$ and $S_1$, determine in which mode, direct-form or transposed-form, the image scaler 202a or 202b operates. The output pixel normalization unit 400 includes a plurality of coupled normalization modules 412, where each normalization module 412 corresponds to and receives a selected filter coefficient 320.

Figure 9A:
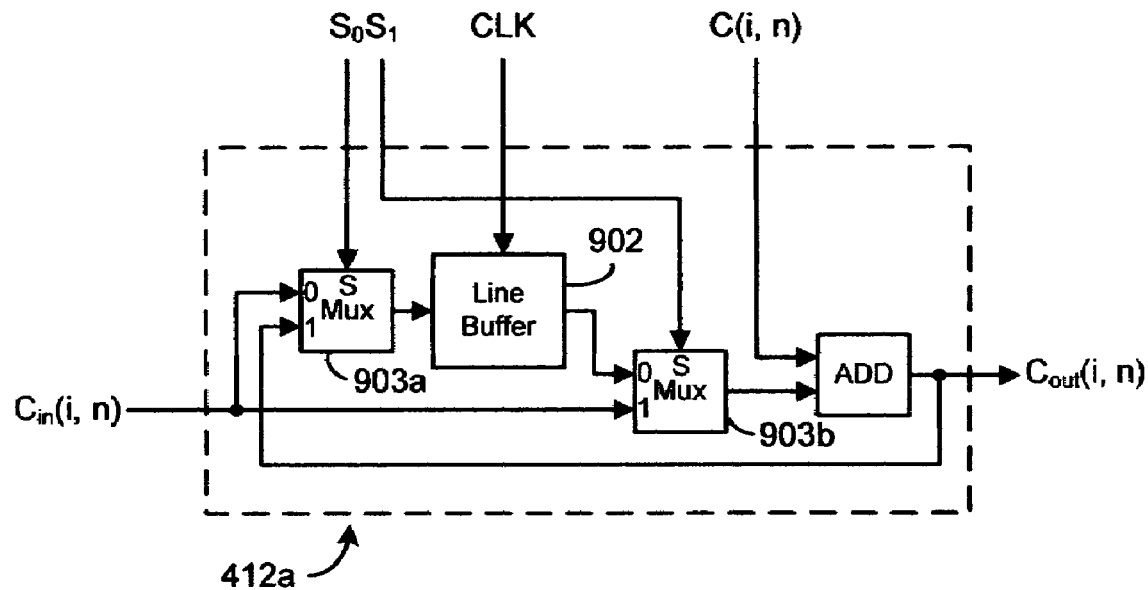
FIG. 9A and FIG. 9B are block diagrams of the normalization module utilized by the vertical and the horizontal image scalers, respectively, according to one embodiment of the present invention.
Figure 9B:
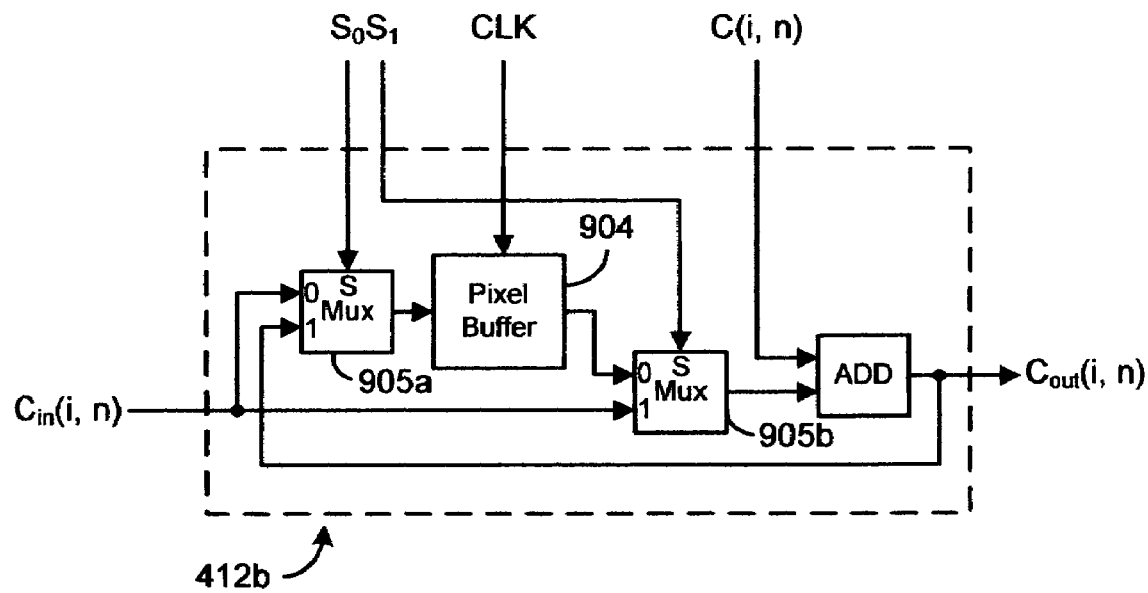

FIG. 9A and FIG. 9B are block diagrams of the normalization module 412 utilized by the vertical and the horizontal image scalers 202a, 202b, respectively, according to one embodiment of the present invention. The normalization module 412a utilized by the vertical image scaler 202a includes a line buffer 902 that receives the input pixel clock signal. Whereas, the normalization module 412b utilized by the horizontal image scaler 202b includes a pixel buffer 904 that also receives the input pixel clock signal. Aside from the buffers 902, 904, both normalization modules 412a, 412b have similar components, e.g., two (2) multiplexers and an adder, and operate in a similar fashion. Both normalization modules 412a, 412b receive input coefficient values, $C_{in}$, from a preceding module 412 and corresponding filter coefficients 320, C. The normalization modules 412a, 412b also receive the clock and control signals, $S_0$ and $S_1$. Both normalization modules 412a, 412b generate output coefficient values, $C_{out}$.

Referring to FIG. 9A, a first multiplexer (MUX) 903a receives two inputs, the input coefficient value $C_{in}$ and the output coefficient value $C_{out}$. The first MUX 903a outputs one of the two inputs depending on the control signal $S_0$. The output of the first MUX 903a is received by the line buffer 902, whose output is controlled by the input pixel clock signal. The output of the line buffer 902 is received by a second MUX 903b, which also receives the input coefficient value $C_{in}$. The output of the second MUX 903b, i.e., either the input coefficient value $C_{in}$, or the output of the line buffer 902 is determined by control signal $S_1$, and added to the corresponding filter coefficient C. The output of the adder is the output coefficient value $C_{out}$, which is received by the next normalization module, and also sent back to the first MUX 903a.

Referring again to FIG. 8, the output coefficient value $C_{out}$ of the last normalization module 412 is received by a pixel buffer 430, which also receives an output pixel clock signal from the sequencer unit 230 (FIG. 2B). The output of the pixel buffer 430 is sent to a divider 414, where the output of the pixel buffer 430 divides the pre-normalized output pixel value 350, ŷ(m), from the reconfigurable interpolation unit 300. The output of the divider 414 is the output pixel data 340, y(m). If this value is the output of a first of the two one-dimensional image scalers, e.g., the output of the vertical image scaler 202a (FIG. 2A), then it is inputted into a second of the two one-dimensional image scalers, e.g., the horizontal image scaler 202b. Otherwise, the output pixel data is the converted output image pixel data 206.

The dynamic normalization of the filter coefficients to calculate the dynamic total filter coefficient for each output pixel, according to the present invention, can be useful in many areas. For example, handling the boundary of the input image to avoid visible border lines around the output image typically requires special attention. For a direct-form or transposed-form FIR filter structure, the calculation of output pixels in the output image close to its boundary will refer to input pixels outside the input image. Discarding these pixels will lead to loss of available pixels from the output image. With static normalization of the filter coefficients, three typical methods are used to assign values to the unavailable pixels outside the input image: (1) duplicate unavailable pixel values from nearest pixels in the input image; (2) wrap around unavailable pixel values from pixels on the opposite side of the input image; and (3) set unavailable pixel values to zero. With dynamic normalization of the filter coefficients to calculate the dynamic total filter coefficient for each output pixel, setting unavailable pixel values and their corresponding filter coefficients to zero yields the best results with minimum boundary effects.

Moreover, for two-dimensional image warping applications such as keystone correction and aspect ratio conversion, the image scaling factor may change linearly or nonlinearly across the entire output image. Dynamic normalization of the filter coefficients is necessary except for schemes where a direct-form FIR filter structure with fixed integer L is used. For image scaling applications where the parameters for linear or nonlinear vertical image scaling are independent of the positions of the output pixels on a horizontal output scan line, such as vertical keystone correction or aspect ratio conversion, the output pixel normalization unit 400 for vertical image scaler 202a accumulates the total filter coefficient received by output pixels on a line-by-line basis, in which case only one accumulator buffer per scan line is needed. For image scaling applications where the parameters for linear or nonlinear vertical image scaling depend on the positions of the output pixels on a horizontal output scan line, such as horizontal keystone correction, the output pixel normalization unit 400 for vertical image scaler 202a will accumulate the total filter coefficient received by the output pixels on a pixel-by-pixel basis, in which case one accumulator buffer for each pixel on a scan line is required.

Figure 10:
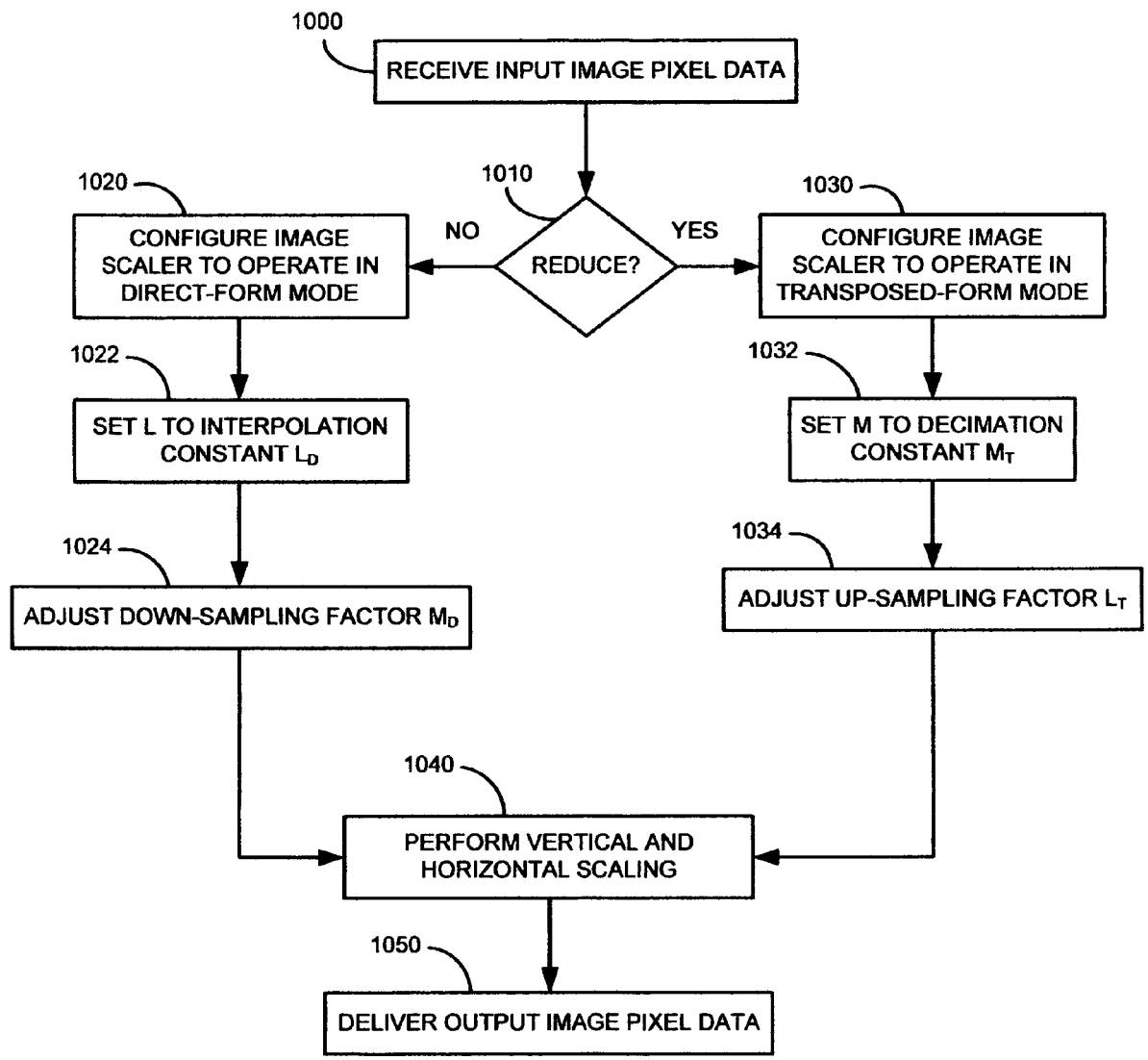
FIG. 10 is a flowchart illustrating a process for scaling an input image according to one embodiment of the present invention.

FIG. 10 is a flowchart illustrating a process for scaling an input image according to one embodiment of the present invention. Referring to FIG. 2A, FIG. 2B and FIG. 10, the process begins when input image pixel data 204 corresponding to the input image is received by the image scaling system 200 (step 1000). The image scaling system 200 determines whether the input image is to be reduced or magnified by a particular scaling factor (step 1010) in vertical and horizontal directions. If the input image is to be magnified in the vertical or the horizontal direction, the corresponding image scaler 202a or 202b is configured to operate in the direct-form mode (step 1020). If the input image is to be reduced in the vertical or the horizontal direction, the corresponding image scaler 202a or 202b is configured to operate in the transposed-form mode (step 1030). Note that the image scalers 202a and 202b can operate in different modes, i.e., one scaler can operate in the direct-form mode for image magnification in either the vertical or horizontal direction, while the other scaler can operate in the transposed-form mode for image reduction in the other direction.

If the image scaler 202a or 202b is configured to operate in the direct-form mode, the up-sampling factor, L, is set to the interpolation constant, $L_D$ (step 1022). Then the down-sampling factor, $M_D$, is adjusted such that the ratio, $L_D/M_D$, is equivalent to the particular magnification scaling factor (step 1024). As stated above, $L_D$ is preferably an integer that is a power of 2 to facilitate division and modulo operations with bit-shifting and bit-masking operations in calculating filter phases and coefficient addresses for selected filter coefficients from the filter coefficient LUT 210. $M_D$ can be an integer or a non-integer to realize arbitrary image scaling factors with high precision.

If the image scaler 202a or 202b is configured to operate in the transposed-form mode, the down-sampling factor, M, is set to the decimation constant, $M_T$ (step 1032). Then the up-sampling factor, $L_T$, is adjusted such that the ratio, $L_T/M_T$, is equivalent to the particular reduction scaling factor (step 1034). As stated above, $M_T$ is preferably an integer that is a power of 2 to facilitate division and modulo operations with bit-shifting and bit-masking operations in calculating filter phases and coefficient addresses for selected filter coefficients from the filter coefficient LUT 210. $L_T$ can be an integer or a non-integer to realize arbitrary image scaling factors with high precision.

In another preferred embodiment, the interpolation constant $L_D$ and the decimation constant $M_T$ are set to the same value. In this manner, the same amount of pixel buffer memory, and the same number of multipliers and adders can be shared by both the direct-form and transposed-form FIR filter structures, resulting in optimal system design and full system resource utilization for both direct-form and transposed-form FIR filter structures. Moreover, because $L_D$ and $M_T$ determine the number of filter coefficients, the same set of predetermined filter coefficient values stored in the filter coefficient LUT 210 can be shared by both direct-form and transposed-form FIR filter structures for a wide range of image magnification and reduction scaling factors.

Referring again to FIG. 10, once the image scalers 202a, 202b have been completely configured, vertical and horizontal scaling is performed (step 1040) by the vertical image scaler 202a and horizontal image scaler 202b, respectively. The image scaling system 200 then delivers the output image pixel data 206 (step 1050).

Figure 11:
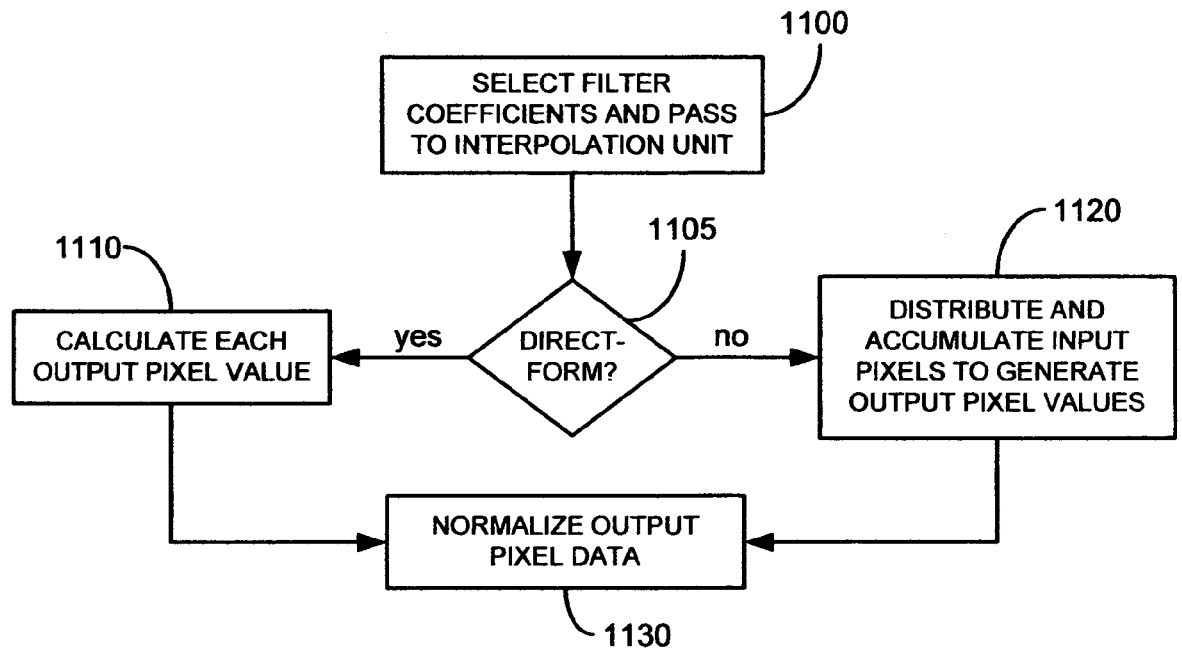
FIG. 11 is a flowchart illustrating a process for calculating output pixels according to one embodiment of the present invention.

FIG. 11 is a flowchart illustrating a process for calculating output pixels according to one embodiment of the present invention. The filter coefficient selection unit 220 selects a plurality of filter coefficients from the filter coefficient LUT 210 according to the relative positions among the input image pixels and the output image pixels, and passes those selected filter coefficients to the reconfigurable interpolation unit 300 (step 1100). If the image scaler 202a or 202b is operating in the direct-form mode (step 1105), the reconfigurable interpolation unit 300 calculates each output pixel value using the selected filter coefficients with the input image pixels within a convolution window surrounding the output pixel (1110). Otherwise, it distributes and accumulates the input pixels using the selected filter coefficients among the output image pixels within a convolution window surrounding the input pixel in the transposed-form mode (1120). The output pixel normalization unit 400 receives the pre-normalized output pixel data 350 from the reconfigurable interpolation unit 300 and normalizes the calculated or accumulated output pixel data 340 (step 1130) to prevent fixed patterns of sampling structure.

According to aspects of the present invention, the image scaling system 200 includes two one-dimensional image scalers 202a, 202b that generate a magnified or reduced output image from the pixel data of an input image. The output image is substantially without aliasing, moiré, and other artifacts over a wide range of image magnification and reduction factors. Each image scaler 202a, 202b comprises a dual mode single-stage FIR filter structure that can switch between operating as a direct-form FIR filter structure and a transposed-form FIR filter structure, using the same components. Thus, the image scaling system 200 according to aspects of the present invention is capable of producing a magnified or a reduced output image of high quality, while minimizing costs and complexity of the FIR filter structure.

According to a preferred embodiment, the image scaling system 200 can be utilized in any display system that performs image signal processing, such as an image capture device, printer, or television display system. For example, the image scaling system 200 can be coupled to a de-interlacer in a television display system, where the de-interlacer converts an interlaced video signal into a progressive scanned video signal which is displayed to a viewer. In such a system, the image scaling system 200 can be used to magnify or reduce the image displayed to the viewer, and to support complicated display formats, such as picture-in-picture (PIP), picture-on-picture (POP), or video menus with multiple display windows.

Figure 12:
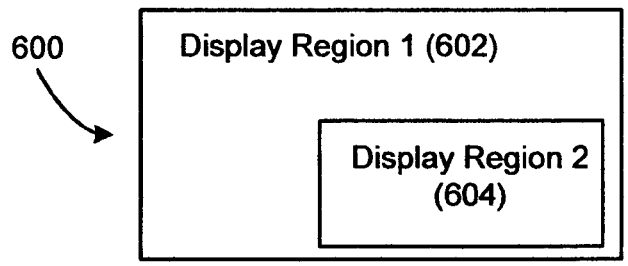
FIG. 12 depicts an exemplary display device used by a display system that supports PIP or POP features.

FIG. 12 depicts an exemplary display device 600 used by a display system that supports PIP or POP features. The display device 600 includes at least two display regions 602, 604, each of which can display different output images. FIG. 13 depicts a block diagram of the display system that utilizes the image scaling system according to one embodiment of the present invention to support the PIP and POP features. As is shown, each display region 602, 604 on the display device 600 is associated with a video channel 30a, 30b that presents an output video signal corresponding to the output image that is to be displayed in the associated display region 602, 604. The input video signals are typically a plurality of video and graphic input video signals with different signal formats, e.g., NTSC, PAL, RGB, YCbCr, and YPbPr, via various signal interfaces, e.g., composite, S-video, component, DVI, HDMI, and VGA.

Each video channel 30a, 30b includes a video and graphic input selection unit 32, the image scaling system 200, a de-interlacer 40 coupled to a frame buffer 50, and at least one gamma correction LUT 60. The video and graphic input selection unit 32 selects an input video signal among the plurality of available video and graphic input video signals. The de-interlacer 40 converts the interlaced video signal into a progressive video output signal. In a preferred embodiment, the de-interlacer 40 is that described in co-pending U.S. application Ser. No. 11/019,017, entitled "METHOD AND APPARATUS FOR PER-PIXEL MOTION ADAPTIVE DE-INTERLACING OF INTERLACED VIDEO FIELDS," filed Dec. 20, 2004, and assigned to the assignee of the present invention, the entirety of which is herein incorporated by reference. The gamma correction LUT 60 is used for automatically adjusting the luminance and color values of the output pixel data to match the luminance and color characteristics of the display device 600. In a preferred embodiment, the gamma correction LUT 60 is generated using the calibration system described in co-pending U.S. application Ser. No. 11/196,640, entitled "METHOD AND SYSTEM FOR AUTOMATICALLY CALIBRATING A COLOR DISPLAY," filed Aug. 2, 2005, and assigned to the assignee of the present invention, the entirety of which is herein incorporated by reference.

According to a preferred embodiment, when the video and graphic input selection unit 32 selects an interlaced input video signal, i.e., even and odd video fields comprising interlacing scan lines, the vertical image scaler 202a is configured to convert the input video signal in such a manner that the converted even and odd output video fields have scan lines that remain evenly interlaced with each other. That is, the even and odd output video fields have their respective scan lines positioned midway among each other, and therefore, the magnified or reduced odd and even video fields from an interlaced video signal can be correctly converted to a progressive video signal by the de-interlacer 40.

In one embodiment, the filter coefficient selection unit 220 for the vertical image scaler 202a is configured to select filter coefficients from the filter coefficient LUT 210 based on the parity of a current input video field. The filter coefficient selection unit 220 assigns a different initial phase at the first output scan line for even and odd video fields so that the corresponding even and odd video fields, after the vertical image scaling process, have scan lines that remain evenly interlaced with each other.

Figures 14A, 14B:
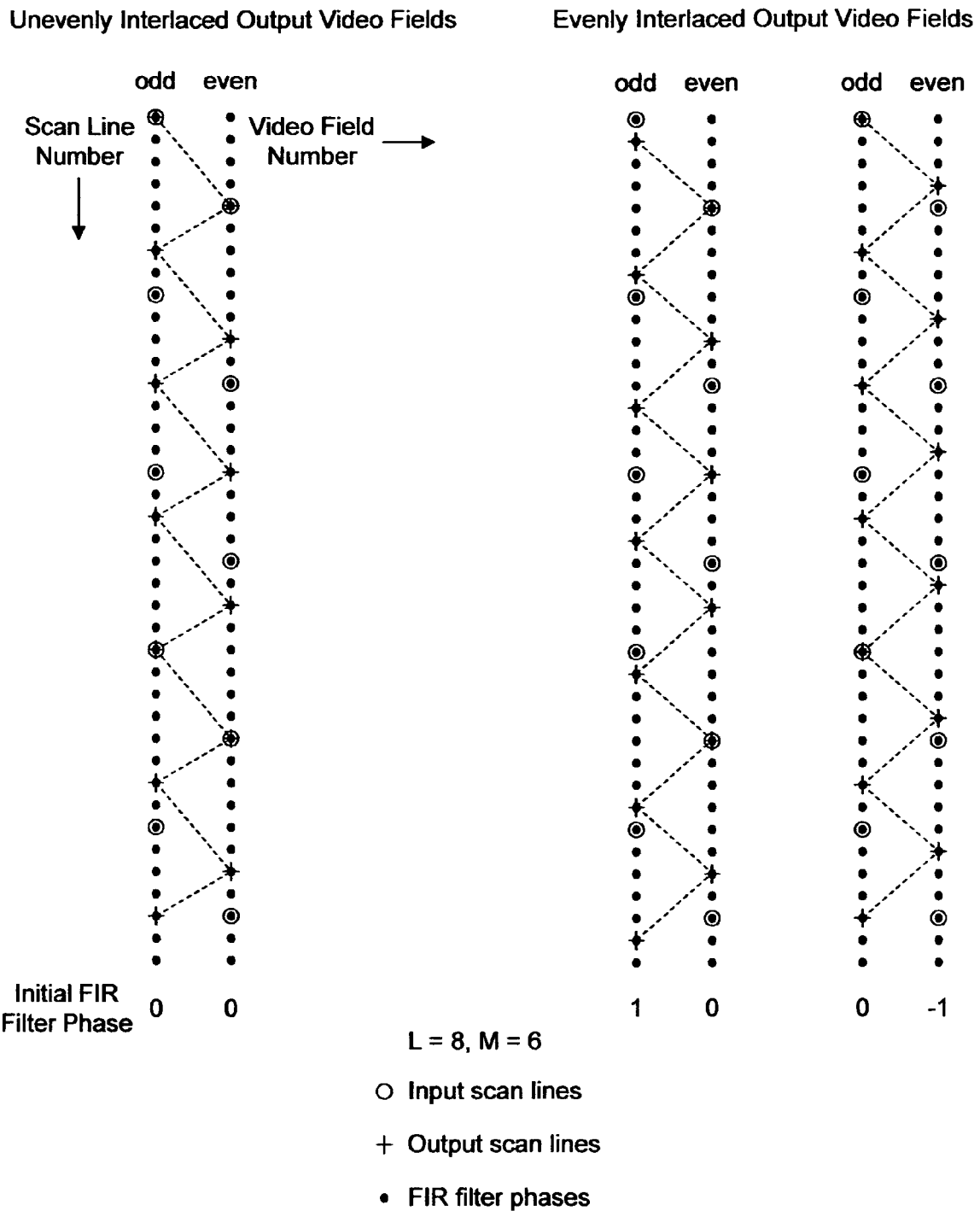
FIG. 14A and FIG. 14B illustrate scan line positions on the spatiotemporal plane for even and odd video fields from an interlaced input video signal.

FIG. 14A illustrates scan line positions on the spatiotemporal plane for even and odd video fields from an interlaced input video signal and the corresponding unevenly interlaced even and odd video fields after an identical vertical image scaling process. FIG. 14B illustrates scan line positions on the spatiotemporal plane for even and odd video fields from an interlaced input video signal and the corresponding evenly interlaced even and odd video fields after vertical image scaling processes depending on the parity of the input video field. In one embodiment, if both up-scaling factor L and down-scaling factor M are even numbers, the interlaced structure of the input video fields can be preserved in the scaled output video fields. Otherwise, approximation can be used to preserve the interlaced structure of the input video fields.

Referring again to FIG. 13, image scaling by the image scaling system 200 is preferably performed before the input video signal is de-interlaced by the de-interlacer 40 for image reduction, as depicted by the solid flow line. Conversely, for image magnification, image scaling is preferably performed after the input video signal is de-interlaced by the de-interlacer 40, as depicted by the dotted flow line. In this manner, the size of the frame buffer 50 and memory bandwidth consumed by the de-interlacer 40 can be minimized. Each output video signal from each video channel 30a, 30b is a progressive video signal that is received by an output pixel data multiplexer 70, which then feeds the output video signals to the display device 600 for display in their respective display regions 602, 604.

When the video and graphic input selection unit 32 selects a progressive input video signal, i.e., video frames comprising progressive scan lines, the vertical image scaler 202a is configured to convert the input video signal in such a manner that each converted output video frame has scan lines that remain progressive. The filter coefficient selection unit 220 for the vertical image scaler 202a is configured to select filter coefficients from the filter coefficient LUT 210 independent of a current input video frame. The filter coefficient selection unit 220 assigns an identical initial phase at the first output scan line for each video frame. Referring again to FIG. 13, image scaling is performed by the image scaling system 200, while the de-interlacer 40 should be bypassed for a progressive input video signal. Each output video signal from each video channel 30a, 30b is a progressive video signal that is received by the output pixel data multiplexer 70, which then feeds the output video signals to the display device 600 for display in their respective display regions 602, 604.

The present invention has been described with reference to certain preferred versions. Nevertheless, other versions are possible. For example, the number and types of lookup tables can vary. Further, alternative steps equivalent to those described for the interpolation and decimation process can also be used in accordance with the parameters of the described implementations, as would be apparent to one of ordinary skill. Therefore, the spirit and scope of the appended claims should not be limited to the description of the preferred versions contained herein.

What is claimed is:

1. An image scaling system for converting a sampling rate of an input video signal comprising input pixel data to produce a magnified or reduced output video image comprising output pixel data, the system comprising:
a first one-dimensional image scaler comprising a single-stage finite-duration impulse response (FIR) filter structure with poly-phase filter responses for receiving and scaling the input pixel data by a scaling factor in either a horizontal or vertical direction to produce output pixel data; and
a second one-dimensional image scaler comprising a single-stage FIR filter structure, the second one-dimensional image scaler coupled in tandem to the first one-dimensional image scaler for scaling by the scaling factor the output pixel data from the first one-dimensional image scaler in a direction perpendicular to that of the first one-dimensional image scaler to produce the magnified or reduced output video image,
wherein each of the first and second one-dimensional image scalers includes a reconfigurable interpolation unit that allows each single-stage FIR filter structure to switch back and forth between operating in a direct-form FIR filter mode and a transposed-form FIR filter mode while using a fixed set of system resources,
such that a wide range of image magnification and reduction scaling factors can be achieved using the fixed set of system resources.

2. The image scaling system according to claim 1 wherein each single-stage FIR filter structure is configured to operate in the direct-form FIR filter mode for image magnification, and wherein each single-stage FIR filter structure is configured to operate in the transposed-form FIR filter mode for image reduction.

3. The image scaling system according to claim 2 wherein the scaling factor is defined by a ratio of L/M, wherein L is an up-sampling factor, and M is a down-sampling factor.

4. The image scaling system according to claim 3 wherein during image magnification, the up-sampling factor is set to a predetermined interpolation constant and the down-sampling factor is selected such that the ratio of the interpolation constant and the down-sampling factor substantially equals the scaling factor and wherein during image reduction, the down-sampling factor is set to a predetermined decimation constant and the up-sampling factor is selected such that the ratio of the up-sampling factor and the decimation constant substantially equals the scaling factor.

5. The image scaling system according to claim 4 wherein the interpolation constant and the decimation constant are a same value.

6. The image scaling system according to claim 4 wherein during image magnification, the down-sampling factor is a non-integer and wherein during image reduction, the up-sampling factor is a non-integer, thereby allowing fine scaling factor control.

7. The image scaling system according to claim 1 wherein each of the first and second one-dimensional image scalers further comprises a normalization unit for normalizing the output pixel data, thereby eliminating fixed patterns of sampling structure resulting from a constant input video signal.

8. The image scaling system according to claim 1 wherein each of the first and second one-dimensional image scalers further comprises:
at least one filter coefficient lookup table for storing a set of filter coefficients for calculating interpolation and decimation values for image magnification and reduction;
a filter coefficient selection unit for selecting a plurality of filter coefficients from the at least one filter coefficient lookup table according to relative positions of input image pixels and output image pixels to one another; and
a sequencer unit for transmitting control and clock signals to the filter coefficient selection unit, to the reconfigurable interpolation unit and to the output pixel normalization unit, wherein the control signals determine in which mode the one-dimensional image scaler operates.

9. The image scaling system according to claim 8 wherein the input video signal is an interlaced input video signal comprising odd and even video fields having evenly interlaced scan lines, and wherein the first one-dimensional image scaler scales the interlaced input video signal in a vertical direction.

10. The image scaling system of claim 9 wherein the filter coefficient selection unit of the first one-dimensional image scaler selects the plurality of filter coefficients from the at least one filter coefficient lookup table based on whether a current input video field is an odd or even video field such that converted even and odd output video fields have scan lines that remain evenly interlaced with each other.

11. A display system comprising:
a display device that includes at least one display region; and
a video channel associated with each of the at least one display region, wherein at least one video channel receives an interlaced input video signal comprising even and odd video fields having evenly interlaced scan lines, wherein each video channel comprises:
an image scaling system for converting a sampling rate of an input video signal, the image scaling system comprising:
a horizontal image scaler comprising a single-stage finite-duration impulse response (FIR) filter structure with poly-phase filter responses, wherein the horizontal image scaler scales the input video signal by a scaling factor in a horizontal direction; and
a vertical image scaler comprising a single-stage finite-duration impulse response (FIR) filter structure with poly-phase filter responses, wherein the vertical image scaler scales the input video signal by the scaling factor in a vertical direction and further comprises:
a filter coefficient lookup table for storing a set of filter coefficients for calculating interpolation and decimation values for image magnification and reduction; and
a filter coefficient selection unit for selecting a plurality of filter coefficients from the filter coefficient lookup table based on relative positions of input image pixels and output image pixels to one another, and, if the input video signal is an interlaced video signal, based on whether a current input video field is an odd or even video field such that converted even and odd output video fields have scan lines that remain evenly interlaced with each other; and
a de-interlacer for converting the interlaced input video signal into a progressive output video signal.

12. The display system according to claim 11 wherein if the scaling factor is greater than one, the de-interlacer converts the interlaced input video signal into a progressive output video signal before the image scaling system converts the sampling rate of the progressive output video signal received from the de-interlacer.

13. The display system according to claim 11 wherein if the scaling factor is less than one, the image scaling system converts the sampling rate of the interlaced input video signal to produce an interlaced output video signal before the de-interlacer converts the interlaced output video signal received from the scaling system.

14. A method for scaling an input video signal comprising input pixel data by a scaling factor to produce a magnified or reduced output video image comprising converted output pixel data, the method comprising:
providing a first one-dimensional image scaler and a second one-dimensional image scaler, wherein each of the first and second one-dimensional image scalers comprises a single-stage finite-duration impulse response (FIR) filter structure with poly-phase filter responses;
allowing each single-stage FIR filter structure to switch back and forth between operating in a direct-form FIR filter mode and a transposed-form FIR filter mode while using a fixed set of system resources;
configuring the first and second one-dimensional image scalers to operate in the direct-form FIR filter mode if the scaling factor is greater than one; and
configuring the first and second one-dimensional image scalers to operate in the transposed-form FIR filter mode if the scaling factor is less than one,
such that a wide range of image magnification and reduction scaling factors can be achieved using the fixed set of system resources.

15. The method according to claim 14 further including defining the scaling factor by a ratio of L/M, wherein L is an up-sampling factor, and M is a down-sampling factor.

16. The method according to claim 15 further including:
if the scaling factor is greater than one, setting the up-sampling factor to a predetermined interpolation constant and selecting a value for the down-sampling factor such that the ratio of the interpolation constant and the down-sampling factor substantially equals the scaling factor; and
if the scaling factor is less than one, setting the down-sampling factor to a predetermined decimation constant and selecting a value for the up-sampling factor such that the ratio of the up-sampling factor and the decimation constant substantially equals the scaling factor.

17. The method according to claim 16 wherein the interpolation constant and the decimation constant are a same value.

18. The method according to claim 16 wherein selecting the value for the down-sampling factor includes selecting a non-integer value and wherein selecting the value for the up-sampling value includes selecting a non-integer value.

19. The method according to claim 14 further comprising:
using the first one-dimensional image scaler to scale the input pixel data by the scaling factor in either one of a horizontal or vertical direction to produce output pixel data;
using the second one-dimensional image scaler to scale the output pixel data received from the first one-dimensional image scaler in the other of the horizontal of vertical direction; and
outputting the converted output pixel data from the second one-dimensional image scaler.

20. The method according to claim 19 further comprising normalizing the output pixel data to eliminate fixed patterns of sampling structure resulting from a constant input video signal.

21. A method for using a single-stage finite-duration impulse response (FIR) filter structure with poly-phase filter responses to scale by a scaling factor an input video signal comprising input pixel data by a scaling factor, the method comprising:
selecting an interpolation constant;
selecting a decimation constant, wherein the interpolation constant and decimation constant determine a number of time-varying filter coefficients that are required for image magnification and image reduction, respectively;
during image magnification, adjusting a down-sampling factor to a value based on the scaling factor and configuring the single-stage FIR filter structure to operate in a direct-form mode that increases a sampling rate by the interpolation constant and then decreases the sampling rate by the down-sampling factor; and
during image reduction, adjusting an up-sampling factor to a value based on the scaling factor and configuring the single-stage FIR filter structure to operate in a transposed-form mode that increases the sampling rate by the up-sampling factor and then decreases the sampling rate by the decimation constant, wherein by utilizing the interpolation constant and decimation constant, the number of time-varying filter coefficients of the single-stage FIR filter structure is controlled for either the direct-form or transposed-form modes and the complexity and cost of the single-stage FIR further structure is fixed for a wide range of image magnification and image reduction factors.

* * * * *